United States Patent
Tsukamoto et al.

(10) Patent No.: US 6,498,794 B1
(45) Date of Patent: Dec. 24, 2002

(54) TRANSMITTER WITH CELL SWITCHING FUNCTION

(75) Inventors: Keiichiro Tsukamoto, Kawasaki (JP); Yoshitaka Taki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/312,995

(22) Filed: May 17, 1999

(30) Foreign Application Priority Data

Dec. 4, 1998 (JP) .......................................... 10-345145

(51) Int. Cl.$^7$ .............................................. H04L 12/56
(52) U.S. Cl. ...................................... 370/395.1; 370/466
(58) Field of Search ................................ 370/465, 466, 370/473, 474, 389, 395.1, 352, 353, 354

(56) References Cited

U.S. PATENT DOCUMENTS

| | | | | |
|---|---|---|---|---|
| 5,359,600 A | * | 10/1994 | Ueda et al. .................. | 370/466 |
| 5,742,600 A | * | 4/1998 | Nishihara .................... | 370/395 |
| 5,878,045 A | * | 3/1999 | Timbs ......................... | 370/466 |
| 5,974,045 A | * | 10/1999 | Ohkura ........................ | 370/352 |
| 6,038,237 A | * | 3/2000 | Tsuruta et al. .............. | 370/468 |
| 6,111,879 A | * | 8/2000 | Chol ........................... | 370/395 |
| 6,151,325 A | * | 11/2000 | Hluchyj ....................... | 370/398 |
| 6,178,184 B1 | * | 1/2001 | Petty .......................... | 370/503 |
| 6,195,346 B1 | * | 2/2001 | Pierson, Jr. ................. | 370/352 |
| 6,266,342 B1 | * | 7/2001 | Stacey et al. ............... | 370/465 |
| 6,272,128 B1 | * | 8/2001 | Pierson, Jr. ................. | 370/352 |
| 6,331,981 B1 | * | 12/2001 | Harth et al. ................. | 370/395.1 |

FOREIGN PATENT DOCUMENTS

| | | |
|---|---|---|
| JP | 5-22403 | 1/1993 |
| JP | 5-22404 | 1/1993 |
| JP | 09093254 | 4/1997 |

* cited by examiner

Primary Examiner—Ken Vanderpuye
(74) Attorney, Agent, or Firm—Katten Muchin Zavis Rosenman

(57) ABSTRACT

A transmitter having an interface module to serve as an interface between ATM cells and synchronous frames. The interface module comprises a plurality of first physical paths for inputting ATM cells with channel identifiers given thereto to identify channels respectively; a second physical path for outputting a synchronous frame signal; a channel identifier inserter for inserting the channel identifiers, which are given to the first physical paths where the ATM cells are inputted, into predetermined areas of the ATM cells; and a mapper for mapping the multi-channel ATM cells with the channel identifiers inserted therein to one synchronous frame signal and outputting the same to the second physical path.

9 Claims, 24 Drawing Sheets

GFC[3:0] (4bit) VPI[7:0] (8bit)

(Channel identifier position in GFC area and VPI area is composed of above 12 bits)

FIG. 8

| Ch No | Channel identifier | Ch No | Channel identifier | Ch No | Channel identifier | Ch No | Channel identifier |
|---|---|---|---|---|---|---|---|
| Ch#1 | 0000 | Ch#5 | 0100 | Ch#9  | 1000 | Ch#13 | 1100 |
| Ch#2 | 0001 | Ch#6 | 0101 | Ch#10 | 1001 | Ch#14 | 1101 |
| Ch#3 | 0010 | Ch#7 | 0110 | Ch#11 | 1010 |       |      |
| Ch#4 | 0011 | Ch#8 | 0111 | Ch#12 | 1011 |       |      |

(Example of 14 channels.
Above 4 bits are disposed in predetermined GFC and VPI areas.)

FIG. 12

| | Input port No. | Input VPI/VCI | Input port No. | Output VPI/VCI |
|---|---|---|---|---|
| OC-12 { | #1 | ×××× | #4-Ch#1 | ×××× |
| | ⋮ | ⋮ | ⋮ | ⋮ |
| | #1 | ×××× | #n-Ch#1 | ×××× |
| | ⋮ | ⋮ | ⋮ | ⋮ |
| DS1 { | #4-Ch#1 | ×××× | #1 | ×××× |
| | ⋮ | ⋮ | ⋮ | ⋮ |
| | #4-Ch#14 | ×××× | #3 | ×××× |
| | ⋮ | ⋮ | ⋮ | ⋮ |
| LAN { | #n-Ch#1 | ×××× | #4-Ch#2 | ×××× |
| | ⋮ | ⋮ | ⋮ | ⋮ |
| | #n-Ch#4 | ×××× | #1 | ×××× |

TRANSMITTER WITH CELL SWITCHING FUNCTION

BACKGROUND OF THE INVENTION

1. Field of the Invention

The present invention relates to a transmitter equipped with a cell switching function, and more particularly to a transmitter adapted for mapping and demapping of synchronous frames containing ATM cells of multiple channels.

2. Description of the Related Art

In the known public transmission network, audio signals and data information are transmitted to be processed via an infrastructure of SONET (Synchronous Optical Network) in a format of STM (Synchronous Transfer Mode). Such service signals according to the STM format are accessed, in each transmitter, at an STS-1 (Synchronous Transport Signal: 51.84 MHz) level conforming with the SONET frame format or a VT (Virtual Tributary: 1.726 MHz) level. External interfaces employed therefor conform with OC-48 (optical signal: 2.4 GHz), OC-12 (optical signal: 600 MHz), OC-3 (optical signal: 150 MHz), DS3 (electric signal: 44.736 MHz), DS1 (electric signal: 1.544 MHz) and so forth. Further, there is practically used of late a data information service which is based on the ATM (Asynchronous Transfer Mode) signal format to realize effective utilization of transmission lines and the band of transmission equipment.

Recently, eager demand is noticed in respect of a transmitter having, in particular, a cell switching function relative to ATM signals of multiple channels for achieving services with ATM signals while running the existing SONET network or the like. However, any transmitter equipped with such a switching function for STM signals and ATM cells has not been available heretofore. When STM signals of multiple channels to be switched are mapped to an STS-1 signal, the mapping positions of the individual channel signals multiplexed to the STM signals are predetermined, so that the signals of the individual channels may be mapped to the relevant frame positions of the STS-1 signal. Also in routing the STM signal of the each channel mapped to the STS-1 signal, it has been possible heretofore to achieve easy routing since the relevant channel can be detected from the corresponding frame position of the STS-1 signal.

However, when connecting a multi-channel ATM network to a SONET network or the like, there may be adopted a method of allocating one channel of each ATM cell to one channel of the STS-1 signal; or when mapping multi-channel ATM cells to one channel of the STS-1 signal, there may be adopted a method of mapping the ATM cells after determining the mapping position of each channel of the ATM cells in the same manner as the method relative to the STM signal. In the former case of allocating ATM cells to one channel, the number of required STS-1 channels becomes equal to that of the channels of ATM cells. Using many STS-1 channels signifies an increase of the number of physical paths in the transmitter, whereby a cross-connector and other devices employed for switching the ATM cells are rendered greater to consequently raise a problem that the transmitter as a whole is also enlarged in scale. Meanwhile, in the latter case of allocating ATM cells to multiple channels, some density nonuniformity is caused in the STS-1 signal due to the density nonuniformity of the multi-channel ATM cells, so that any low-density channel portion in the STS-1 signal is not usable for any high-density channel of the ATM cells to eventually result in an extreme inefficiency.

The ATM cells are routed in accordance with VPI/VCI which represent logical addresses stored in an ATM header, and then each ATM cell is transmitted to the relevant network. Since a logical connection is set per network (per ATM channel), there may occur a case where the same logical address is set in different ATM channels. In such a case, if each channel mapping position is not determined, it becomes impossible to identify the respective channels of the ATM cells mapped to the STS-1 signal, hence raising another problem that proper routing to the relevant network fails to be performed. In addition, there may arise a further problem that, since no discrimination is executable between the channels when the ATM cells mapped to the STS-1 signal are distributed to the relevant channels, exact distribution to the individual channels is rendered impossible.

SUMMARY OF THE INVENTION

It is therefore an object of the present invention to provide a transmitter capable of efficiently mapping ATM cells of multiple channels to one STS-1 signal.

Another object of the present invention resides in providing a transmitter which is capable of routing ATM cells to any interface module from an interface module containing multiple channels.

And a further object of the present invention is to provide a transmitter capable of routing ATM cells from any interface module to any network of an interface module containing multiple channels.

In accordance with an aspect of the present invention, there is provided a transmitter equipped with a cell switching function and having an interface module to serve as an interface between ATM cells and synchronous frames. The transmitter comprises a plurality of first physical paths for inputting ATM cells with channel identifiers given thereto to identify channels respectively; a second physical path for outputting the synchronous frame signal; channel identifier insertion means for inserting the channel identifiers, which are given to the first physical paths where the ATM cells are inputted, into predetermined areas of the ATM cells; and mapping means for mapping the multi-channel ATM cells, where the channel identifiers are inserted, to one synchronous frame signal and outputting the same to the second physical path.

Preferably, a detection means is incorporated in the interface module for detecting whether a predetermined value is set or not in the predetermined area of each ATM cell, and discarding any ATM cell where the predetermined value is not set.

In the above structure, when the interface module contains multiple channels, channel identifiers are previously given respectively to the individual first physical paths in the interface module. The channel identifier insertion means inserts the channel identifier given to the relevant first physical path into a predetermined area (e.g., cell header) of the ATM cell inputted from the first physical path. The mapping means maps the multi-channel ATM cells, where the channel identifiers are inserted, to the synchronous frame signal. Since the channel identifiers are inserted in the ATM cells mapped to the synchronous frame signal, any ATM cell can be identified with respect to the relevant channel, so that proper routing thereof to desired channels can be performed when the interface module is used in the transmitter.

In accordance with another aspect of the present invention, there is provided a transmitter equipped with a cell switching function and having an interface module to serve as an interface between ATM cells and synchronous frames. The transmitter comprises a plurality of first physical paths for inputting ATM cells with channel identifiers given thereto to identify channels respectively; a second physical path for inputting a synchronous frame signal where multi-channel ATM cells are mapped; and demapping means for demapping the ATM cells mapped to the synchronous frame signal and outputting the ATM cells to the first physical paths corresponding to the channel identifiers inserted into the predetermined areas of the ATM cells.

Preferably, a detection means is incorporated in the interface module for detecting whether the value in the predetermined area of each ATM cell is coincident or not with any of the channel identifiers, and the ATM cell is discarded if the result of such detection signifies no coincidence with any of the channel identifiers.

A channel identifier is previously given to each of first physical paths. The demapping means demaps the ATM cells mapped to the synchronous frame signal inputted from the second physical paths, and outputs each ATM cell to the relevant first physical path having the channel identifier inserted into the predetermined area of the ATM cell. Consequently, even in case the interface module contains multiple channels, it becomes possible to output the ATM cell to the relevant desired channel.

In accordance with a further aspect of the present invention, there is provided a transmitter having a cell switch module for routing ATM cells. The transmitter comprises a plurality of first physical paths for inputting a first synchronous frame signal where the ATM cells are mapped; a plurality of second physical paths for outputting a second synchronous frame signal; demapping means for demapping the ATM cells mapped to the first synchronous frame signal inputted from each of the first physical paths; mapping means incorporated correspondingly to the second physical paths for mapping the input ATM cells to the second synchronous frame signal; an identifier conversion table containing items which include routing information relative to the first physical paths where the first synchronous frame signal is inputted, logical addresses of the ATM cells, input-source channel identifiers in case the first synchronous frame signal holds multi-channel ATM cells, routing information relative to the output destinations of the ATM cells, and channel identifiers of the output destinations of the ATM cells in case the second synchronous frame signal, where the ATM cells are mapped, holds the multi-channel ATM cells; cross-connect means for outputting the ATM cells to the relevant mapping means on the basis of the routing information which conforms with the channel identifiers and the logical addresses of the ATM cells inputted from the first physical path; and a channel identifier update means for inserting the relevant channel identifier into the predetermined area of the first ATM cell on the basis of the routing information and the logical address relative to the first ATM cell in case the second synchronous frame signal, where the first ATM cells is mapped, holds the multi-channel ATM cells.

In the structure mentioned, the identifier conversion table contains items including the input-source channel identifiers in case the first synchronous frame signal holds multi-channel ATM cells, and the output-destination channel identifiers in case the second synchronous frame signal holds multiple-channel ATM cells. When the first synchronous frame signal holds multi-channel ATM cells, the cross-connect means acquires the routing information on the basis of the logical address and the channel identifier inserted into the predetermined area of each ATM cell, and then outputs the same to the relevant mapping means in response to such routing information. Consequently, even in case the ATM cells of different channels having coincident logical addresses are mapped to the same first synchronous frame, each ATM cell can be routed to the desired output destination properly. Further in case the multi-channel ATM cells are mapped to the second synchronous frame, the channel identifier update means acquires, from the identifier conversion table, the routing information and the output-destination channel identifier on the basis of the logical addresses of the ATM cells, and then inserts the output-destination channel identifier into the predetermined area of the relevant ATM cell. Consequently, when the interface module inputs the second synchronous frame where the multi-channel ATM cells are mapped, each ATM cell can be routed to the relevant channel corresponding to the channel identifier.

In accordance with a still further aspect of the present invention, there is provided a transmitter using the aforementioned interface module and cell switch module, wherein each ATM cell can be routed properly to a desired interface module from the interface module containing multiple channels, and also each ATM cell can be routed from any interface module to a desired channel of the interface module containing multiple channels.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 8 shows an example of a DS1 channel identifier;

FIG. 12 shows the contents of an identifier conversion table in FIG. 11;

DESCRIPTION OF THE PREFERRED EMBODIMENTS

Figure 1:
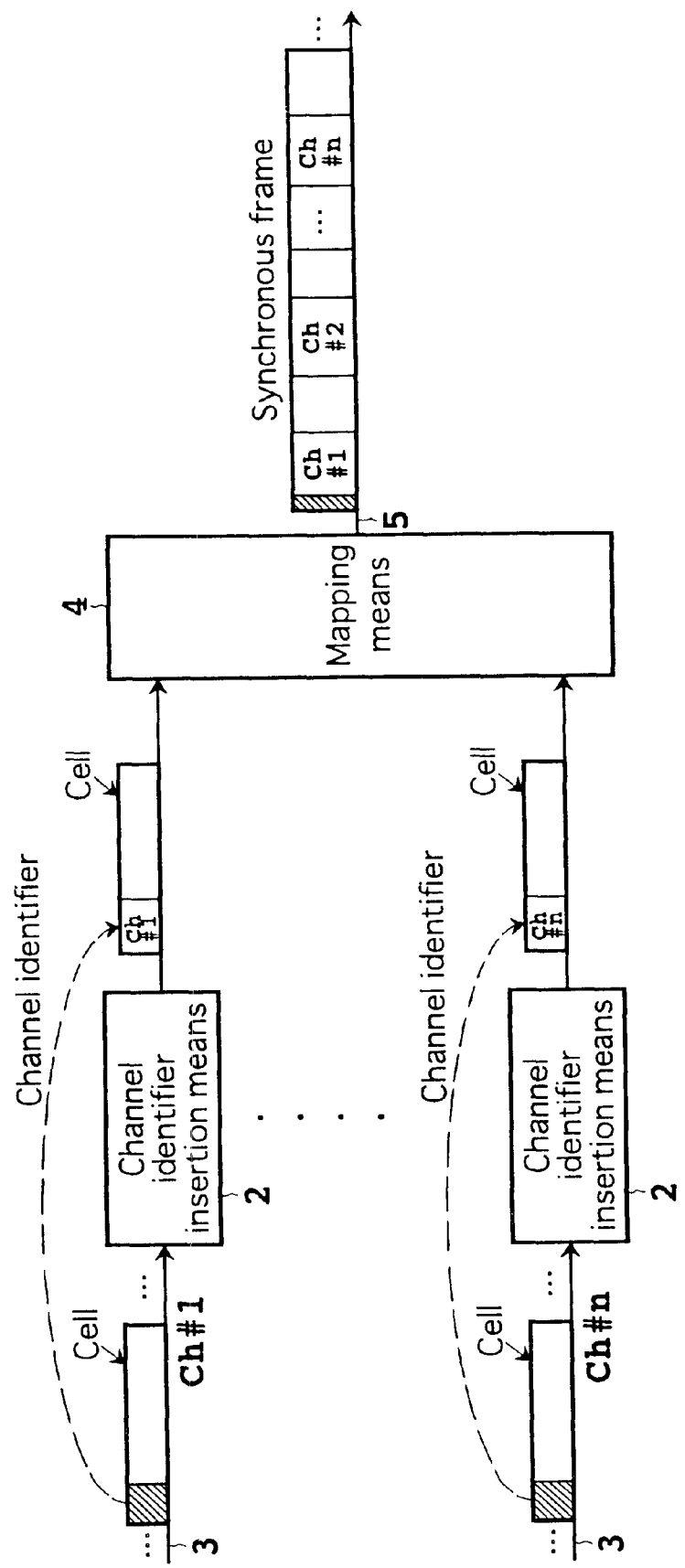
FIG. 1 is a first principle block diagram of the present invention.

Prior to describing some preferred embodiments of the present invention, the principle thereof will be explained first with reference to FIGS. 1 and 2. FIG. 1 is a first principle block diagram of an interface module. As shown in this diagram, an up interface module comprises channel identifier insertion means 2 and a mapping means 4. A channel identifier is previously given to each physical path 3 to which an ATM cell is inputted. The channel identifier insertion means 2 inserts a channel identifier ch#i, which is allocated to the cell-inputted physical path 3, into a predetermined area of the input ATM cell and then outputs the ATM cell to the mapping means 4. Subsequently the mapping means 4 maps the ATM cell, where the channel identifier ch#i is inserted, to a synchronous frame of STS-1 signal or the like in succession and then outputs the same to a physical path 5. Consequently in the ATM cell switch module, when the STS-1 signal holding the mapped multi-channel ATM cells is inputted, the ATM cells can be routed in accordance with the channel identifiers ch#i and the logical addresses inserted respectively into the ATM cells mapped to the STS-1 signal.

Figure 2:
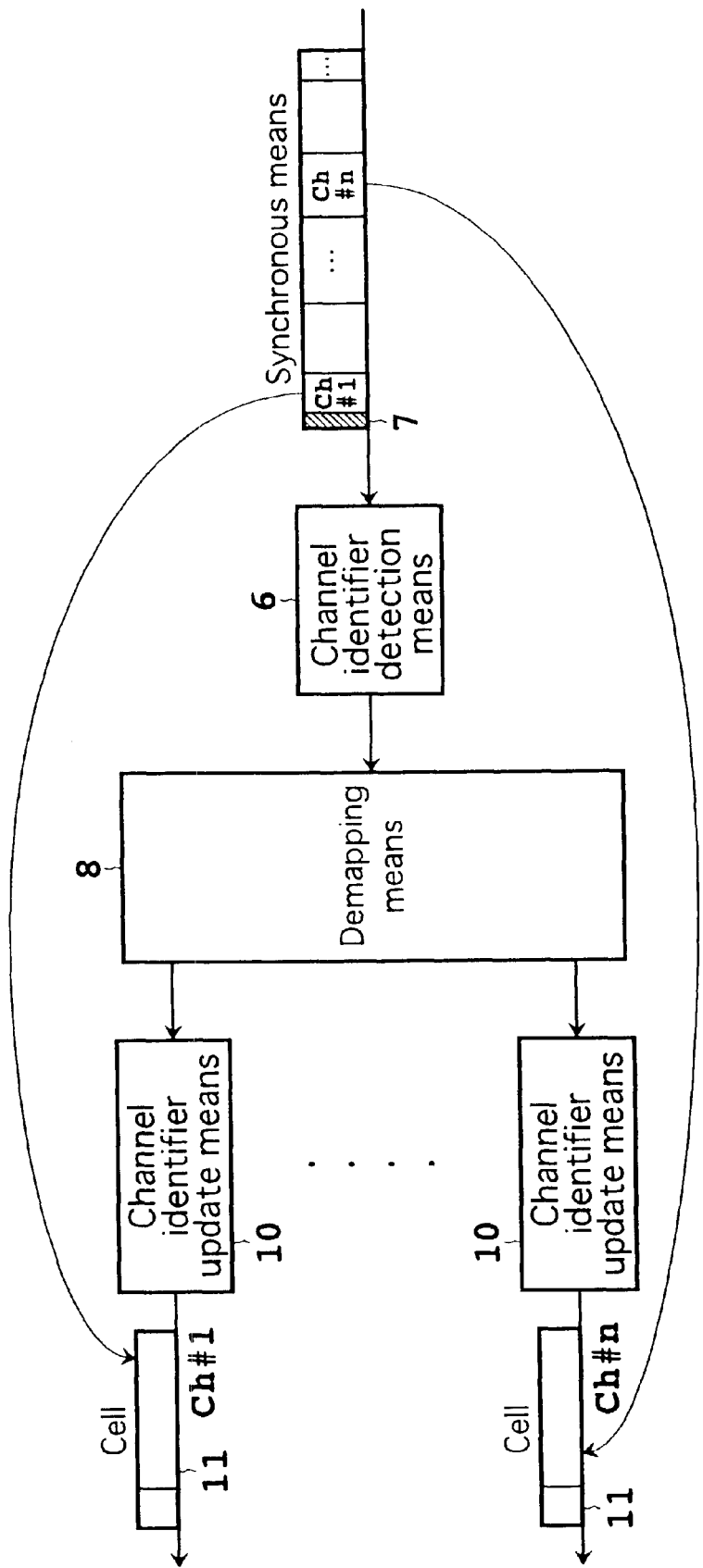
FIG. 2 is a second principle block diagram of the present invention.

FIG. 2 is a second principle block diagram of another interface module. As shown in this diagram, a down interface module comprises a channel identifier detection means 6, a demapping means 8 and channel identifier update means 10. ATM cells mapped to a synchronous frame of STS-1 signal or the like with inserted channel identifiers are inputted from a physical path 7 to the channel identifier detection means 6. Subsequently the channel identifier detection means 6 detects, in synchronism with the frame, the channel identifier ch#i inserted into the relevant ATM cell. The demapping means 8 demaps the ATM cells mapped to the synchronous frame signal, and then outputs the same to the channel identifier update means 10 which correspond to the channel identifiers ch#i inserted respectively into the relevant ATM cells. In response to input of each ATM cell, the channel identifier update means 10 reinserts a predetermined value into the area where the channel identifier ch#i of the relevant ATM cell is inserted, and then outputs the same to a physical path 11.

Figure 3:
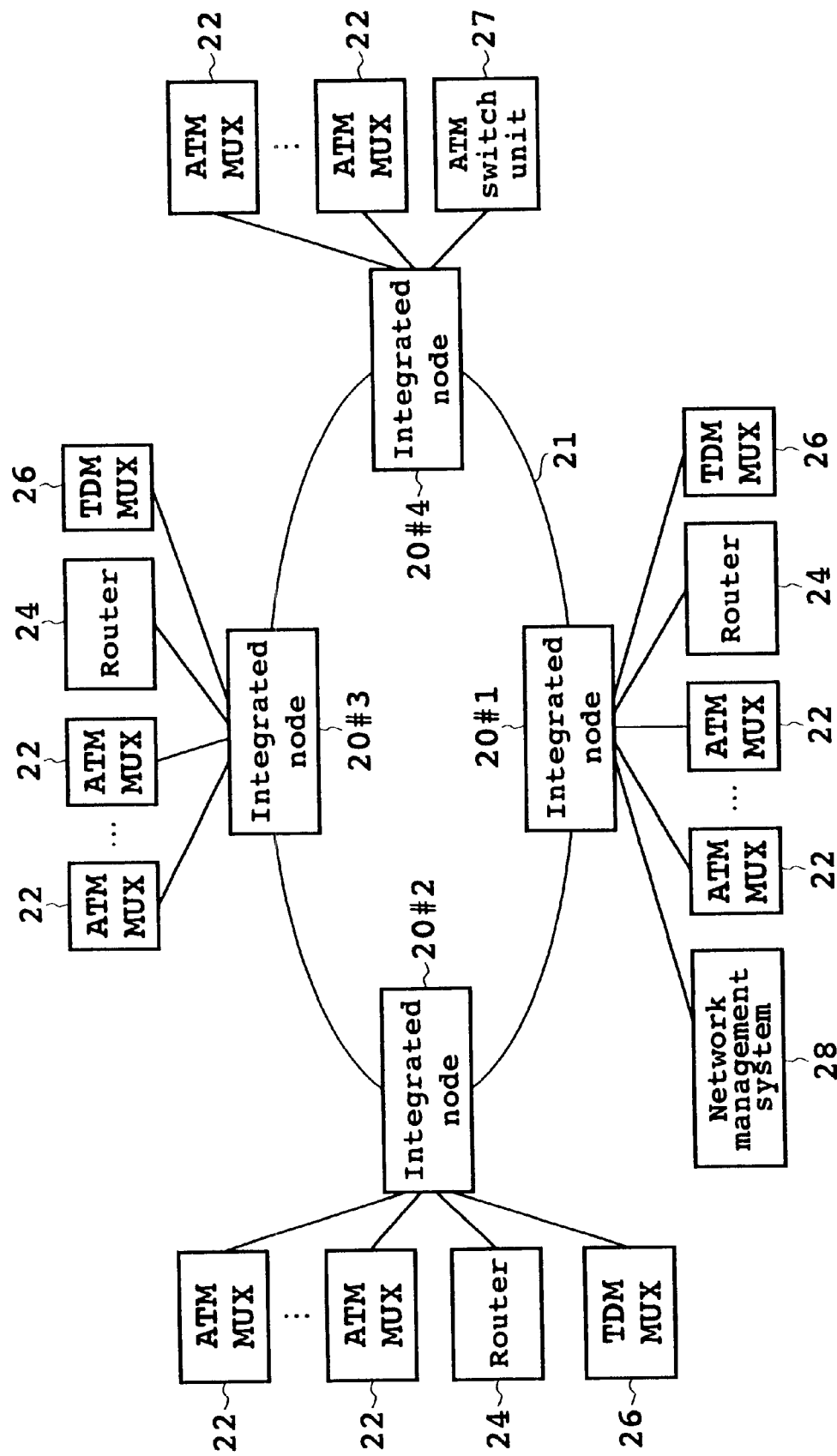
FIG. 3 shows the configuration of a network according to an embodiment of the present invention.

Hereinafter a preferred embodiment of the present invention will be described in detail with reference to the accompanying drawings. FIG. 3 is a block diagram of a network according to the embodiment of the present invention. As shown in this diagram, integrated nodes 20#1–20#4 constitute a ring network via a main transmission line 21 composed of optical fiber (e.g., OC-12 or OC-48). Each of the integrated nodes 20#1–20#4 serves as an ADM (Add Drop Multiplexer) which is a transmitter capable of handling both STM signal and ATM signal. Each of such transmitters 20#1–20#4 contains, in the form of an interface module, interfaces adapted for OC-n (where n=3, 12, 48), DS1/DS3 TDM, DS1/DS3 CR (cell relay), DS1/DS3 FR (frame relay), and ethernet. For example, a router 24 and so forth are connected to the ethernet interface; a TDM MUX 26 is connected to the DS1/DS3 TDM interface; and an ATM MUX 22, an ATM switch unit 27 and so forth are connected to the DS1/DS3 CR and DS1/DS3 FR interfaces.

Each of the DS1 interface and the ethernet interface is capable of containing multiple channels in a single interface module. For example, the DS1 interface can contain a maximum of 14 channels, and the ethernet interface can contain a maximum of 4 channels. Various terminals such as personal computers, ATM terminals and telephone terminals are connected to the MUX 22, the router 24 and the TDM MUX 26. A network management system 28 manages each of the transmitters 20#1–20#4 from a remote site by downloading thereto the routing information for enabling each of the transmitters 20#1–20#4 to perform cross connection of ATM cells and so forth.

Figure 4:
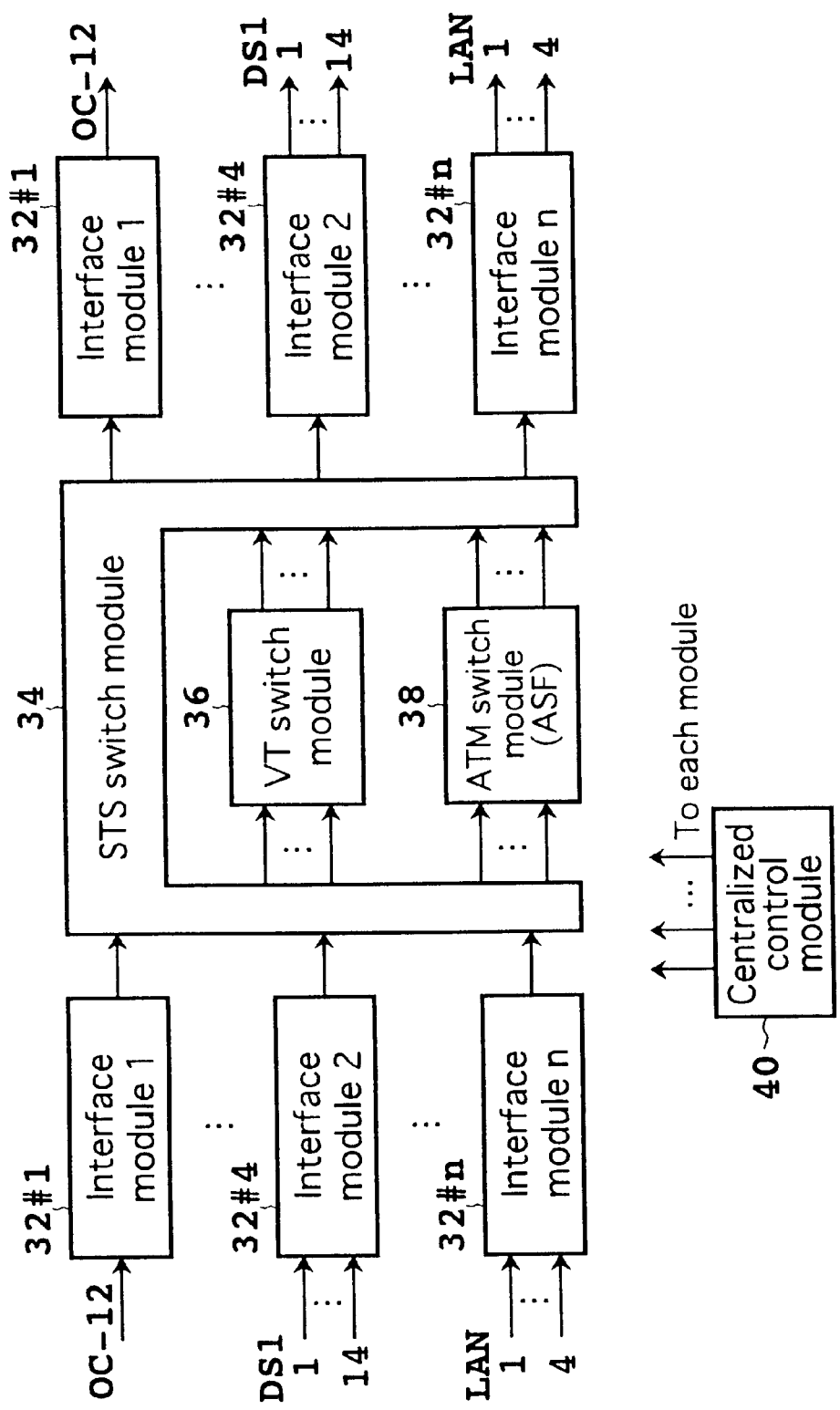
FIG. 4 is a block diagram of a transmitter in an embodiment of the present invention.

FIG. 4 is a block diagram of a transmitter represented by an embodiment of the present invention. The transmitter shown in this diagram is used in the integrated nodes 20#1–20#4 included in FIG. 3. This transmitter comprises a card slot containing a plurality of interface modules 32#1–32#n, an STS switch module 34, a VT switch module 36, an ATM cell switch module (ASF: ATM Switch Fabric) 38, and a centralized control module 40. Each of the interface modules 32#1–32#n is a path terminator which presides over the interface corresponding to multi-channel services of various kinds, wherein signals prescribed in conformity with external formats are multiplexed/demultiplexed to signals of a common internal format handled in the transmitter (e.g., STS-1 signal (50 MHz)) and then are outputted to the STS switch module 34, or an STS-1 signal inputted from the STM switch module 34 is demultiplexed/multiplexed to a signal of each external format. The interface modules 32#1–32#n are interfaces adapted for OC-n (where n=3, 12, 48), DS1, DS3 and LAN. Although this embodiment represents an example containing a SONET of OC-n, it is a matter of course that interfaces for any novel synchronous signal network conforming with the TTC (Telecommunication Technology Committee) standards (JTG-707, JT-G708, JT-G709) in Japan can also be contained. In the data link layer of services that handle ATM cells in such interfaces, there are included LAN signals relative to ethernet packets and so forth, DS1/DS3 UNI (User Network Interface) signals, DS1/DS3 signals used in frame relay/cell relay services, and OC-3 UNI, OC-N (where N=3, 12, 48) signals using an optical interface for SONET inclusive of a case where cells are mapped to the STS-1 signal. The interface module 32#1 serves for, e.g., OC-12; the interface module 32#2 serves for, e.g., OC-3; the interface module 32#3 serves for, e.g., DS3; the interface module 32#4 serves for, e.g., ATM cells of DS1 containing channels ch#1–ch#14; and the interface module 32#n inputs data packets used in LAN. Each LAN packet is converted from the IP address of its packet header into a corresponding VPI/VCI and then is divided into ATM cells. Thereafter the cells are mapped to the STS-1 signal and then are outputted to the STS switch module 34.

As for DS1 and LAN, multiple channels are contained in the interface modules 32#4 and 32#n, and multi-channel signals are mapped to one train of STS-1 signal to enhance the efficiency of using the STS-1. Such mapping of multi-channel ATM cells to one train of STS-1 signal is not limited merely to the DS1 or LAN signal alone. And it is also possible to map the ATM cells to a synchronous frame signal different from the STS-1 signal, e.g., to an STS-3c signal. In this case, the number of containable channels is increased, and the kinds of interfaces are rendered more various. The number of channels to be contained in the STS-1 signal is arbitrary unless the total rate exceeds the STS-1 rate (50 MHz). In case the STS-1 signal outputted from each of the interface modules 32#1–32#n holds mapped ATM cells, the STS switch module 34 cross-connects and outputs the STS-1 signal to an input port of the ASF 38 in accordance with the routing information. Meanwhile, in case the STS-1 signal holds a mapped VT signal, the STS switch module 34 cross-connects and outputs the STS-1 signal to an input port of the VT switch module 36.

The VT switch module 36 first separates the STS-1 signal into VT level signal, then executes a VT pointer process and VT level cross-connection, and after multiplexing to the STS-1 signal, outputs the same to the STS switch module 34. The ASF 38 demaps the STS-1 signal into ATM cells and updates the port ID of each ATM cell (by inserting an output channel identifier when the output VPI/VCI or the output STS-1 holds mapped multi-channel ATM cells). Thereafter the ASF 38 cross-connects each ATM cell in accordance with the input port number (including the input channel identifier) and the input VPI/VCI, thereby mapping the ATM cells to the STS-1 signal per output port, and then outputs the same to the STS switch module 34. Subsequently the STS switch module 34 outputs the STS-1 signal, which is obtained from the VT switch module 36 and the ASF 38, to the corresponding interface modules 32#1–32#n in accordance with the routing information.

The interface modules 32#1–32 #n convert the input STS-1 signal, which is obtained from the STS switch module 34, into a signal of the corresponding external interface, and then outputs the converted signal to the transmission line. The centralized control module 40 manages all network faults, routing information and so forth concentratively.

Figure 5:
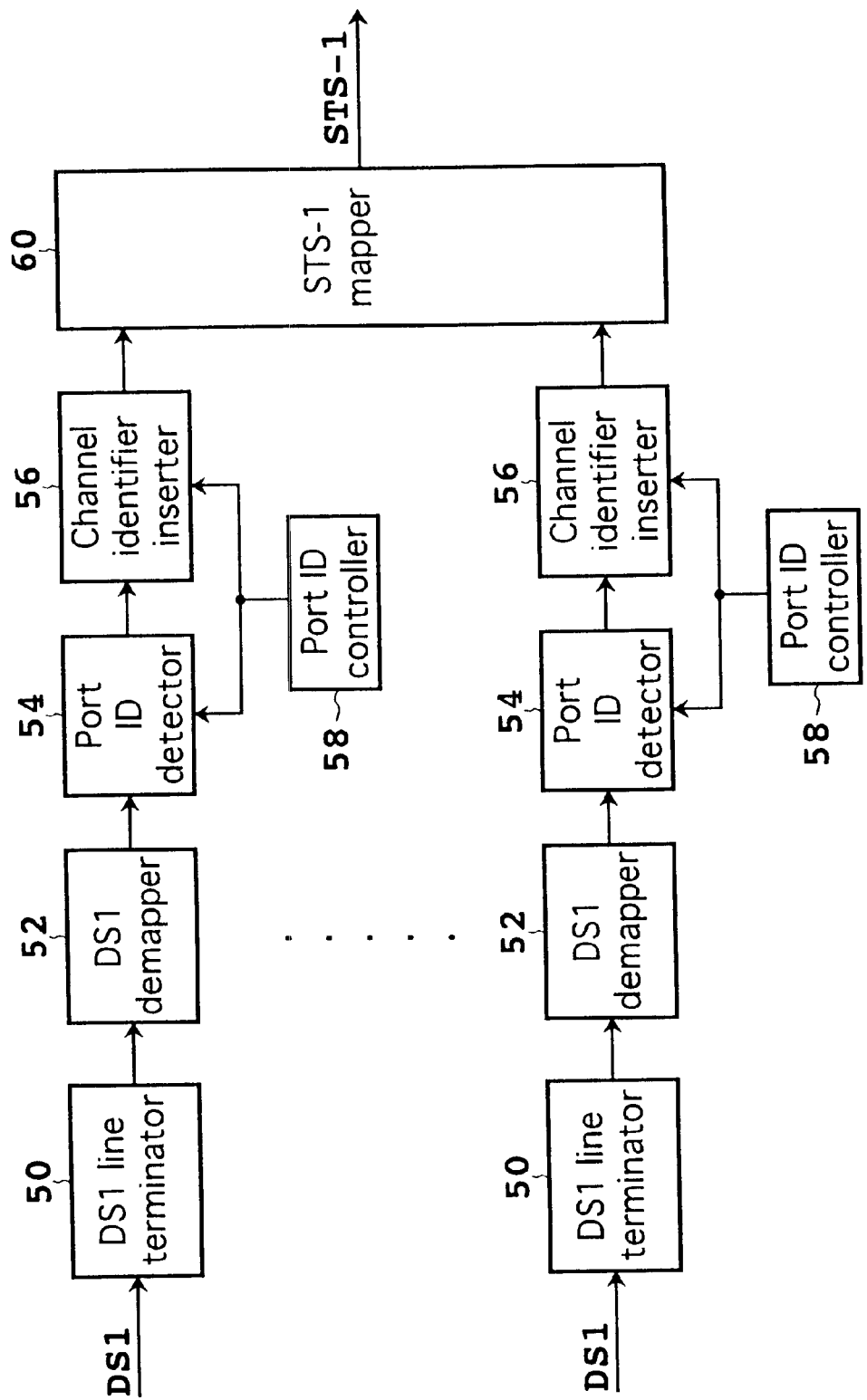
FIG. 5 is a block diagram of a DS1 interface module (up) in FIG. 4.

FIG. 5 is a block diagram of the DS1 interface module (up) shown in FIG. 4. The DS1 interface module 32#4 comprises a DS1 line terminator 50, a DS1 demapper 52, a port ID detector 54, a channel identifier inserter 56, a port ID controller 58 and an STS-1 mapper 60. The DS1 line terminator 50 terminates the DS1 interface and outputs the DS1 signal inputted from the transmission line to the DS1 demapper 52. Subsequently, in synchronism with the DS1 frame, the DS1 demapper 52 separates the ATM cells mapped to the DS1 frame and then outputs the same to the port ID detector 54.

Figure 6:
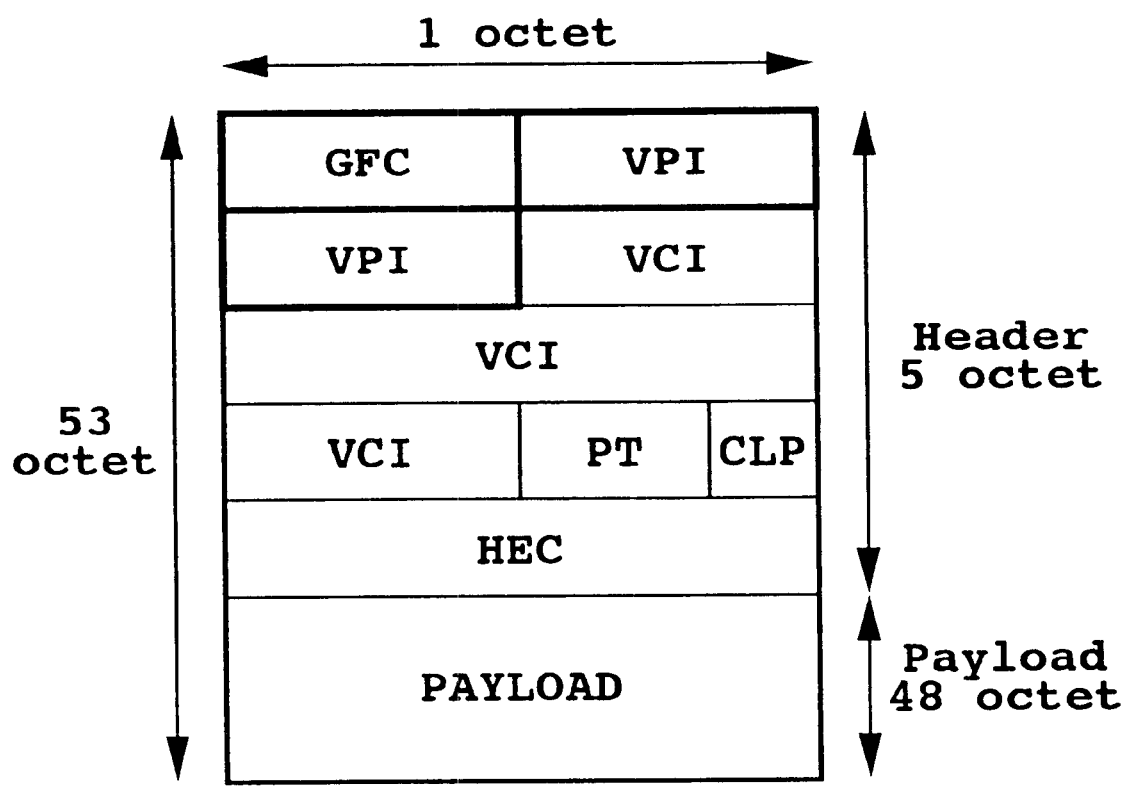
FIG. 6 shows the format of an ATM cell.

FIG. 6 shows the format of an ATM cell. As shown in this diagram, an ATM cell is composed of a 5-byte header and a 48-byte payload. The header is composed of a 4-bit generic flow control (GFC), an 8-bit VPI (virtual path identifier), a 16-bit VCI (virtual channel identifier), a 3-bit PT (payload type), and an 8-bit HEC (header error control). In each DS1 network accommodated in the interface module 32#4, the user VPI and VCI in the network are so determined as to be unique therein. However, since networks are constituted independently of each other, the same VPI and VCI may be used between different networks. As the ATM cell inputted from the 14-channel DS1 network is mapped to the 1-channel STS-1 signal, information (channel identifier) for identifying the channel relevant to the input ATM cell is needed. In order to meet this requirement, a channel identifier is uniquely given to each DS1 network of 14 channels. Thus, the channel relevant to each input ATM cell can be identified by inserting the channel identifier into the port ID area of the ATM cell.

Figure 7:
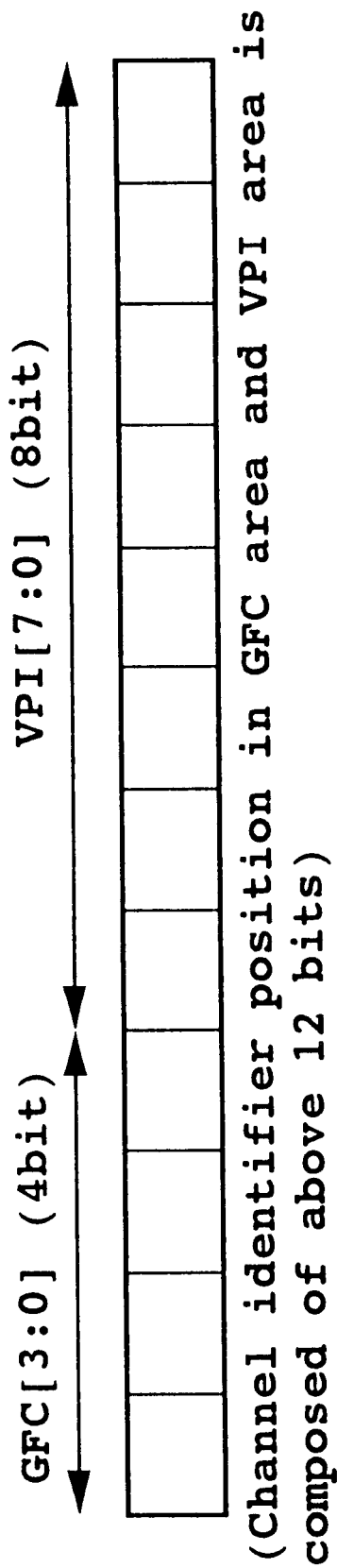
FIG. 7 shows a port ID area.

FIG. 7 shows an example of a port ID area. In this embodiment, arbitrary 12 bits in a GFC area and a VPI area are used as a port ID area. The reason for using a GFC area and a VPI area resides in that these areas are left unused and have specific values (hereinafter referred to as expected values) in most cases, and also that the harmful influence resulting from temporary insertion of a channel identifier for cross-connection of an ATM cell in the ASF 38 is minimal. The size of the port ID area used for a channel identifier is determined according to the number of channels contained in one train of STS-1 signal. For example, when there are 14 channels as in the case of DS1, a channel identifier is composed of 4 bits.

FIG. 8 shows an example of a DS1 channel identifier. As shown in this diagram, channels ch#1–ch#14 are coded as "0000–1101" with the use of a GFC area. The port ID detector 54 in FIG. 5 detects the port ID of the input ATM cell in case a signal outputted from the port ID controller 58 indicates that the port ID is enable, and then outputs the ATM cell to the channel identifier inserter 56 if the port ID preset in the port ID area of the ATM cell is coincident with the expected value, or discards the ATM cell if the port ID area is not coincident with the expected value. Meanwhile, in case the signal outputted from the port ID controller 58 indicates that the port ID is disable, the port ID detector 54 does not detect the port ID and outputs the ATM cell directly to the channel identifier inserter 56. In case the signal outputted from the port ID controller 58 indicates that the port ID is enable, the channel identifier inserter 56 inserts the channel identifier, which is allocated to the channel relevant to the input ATM cell, into the port ID area and then outputs the same to the STS-1 mapper 60. Meanwhile, in case the signal outputted from the port ID controller 58 indicates that the port ID is disable, the channel identifier inserter 56 outputs the ATM cell directly to the STS-1 mapper 60. The port ID controller 58 outputs a signal indicative of whether the port ID is enable or disable. In accordance with the routing information, the centralized control module 40 notifies the port ID controller 58 of whether the port ID is enable or disable.

The port ID is enable when multiple DS1 channels are contained in the interface module 32#4. Meanwhile, the port ID is disable when a single DS1 channel is contained in the interface module 32#4. The STS-1 mapper 60 has unshown buffer memories corresponding respectively to the DS1 channels and, after mapping the ATM cells stored in the buffer memories to the STS-1 signal, outputs the same to the STS switch module 34. No channel is allocated previously to the STS-1 signal, and the stored ATM cells are read out cyclically from the buffer memories and then are mapped to the STS-1 signal.

Figure 9:
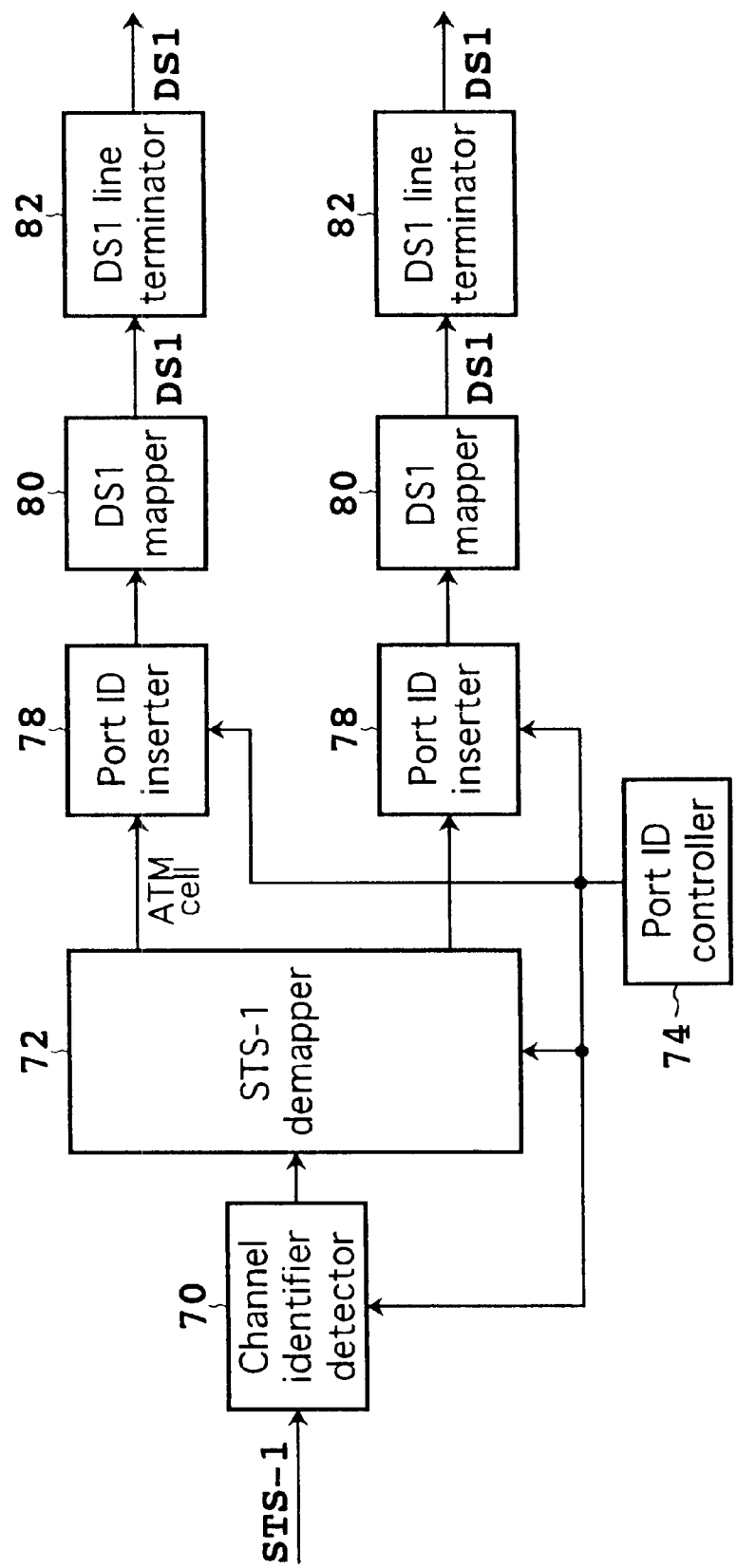
FIG. 9 is a block diagram of a DS1 interface module (down) in FIG. 4.

FIG. 9 is a block diagram of the DS1 interface module (down) included in FIG. 4. As shown in this diagram, the down DS1 interface module 32#4 comprises a channel identifier detector 70, an STS-1 demapper 72, a port ID controller 74, a port ID inserter 76, a DS1 mapper 80, and a DS1 line terminator 82. In case a signal outputted from the port ID controller 74 indicates that the port ID is enable, the channel identifier detector 70 detects the channel identifier of the relevant ATM cell mapped to the STS-1 signal. And if the detected channel identifier is coincident with any of the channel identifiers in use, the relevant ATM cell mapped to the STS-1 signal is outputted to the STS-1 demapper 72. Meanwhile, if the detected channel identifier is not coincident with any of the channel identifiers in use, the relevant ATM cell is discarded (i.e., the area of the relevant ATM cell is regarded as an idle cell), and the STS-1 signal is outputted to the STS-1 demapper 72. In another case where the signal outputted from the port ID controller 74 indicates that the port ID is disable, the STS-1 signal is outputted directly to the STS-1 demapper 72.

In case the port ID is enable, the STS-1 demapper 72 separates the ATM cell mapped to the STS-1 signal, and then outputs the same to the port ID inserter 78 of the channel corresponding to the channel identifier inserted into the relevant ATM cell. Meanwhile, in case the port ID is disable, the STS-1 demapper 72 separates the ATM cell mapped to the STS-1 signal, and then outputs the ATM cell to the specific port ID inserter 78. Subsequently, in case the port ID is enable, the port ID inserter 78 changes the channel identifier inserted into the ATM cell to the expected value, and then outputs the same to the DS1 mapper 80. In another case where the port ID is disable, the port ID inserter 78 lets through the ATM cell and outputs the same to the DS1 mapper 80 without changing the channel identifier. The DS1 mapper 80 maps the input ATM cell to the DS1 signal and outputs the same to the DS1 line terminator 82. Then the DS1 line terminator 82 outputs the DS1 signal to a DS1 network in conformity with an external interface.

Figure 10:
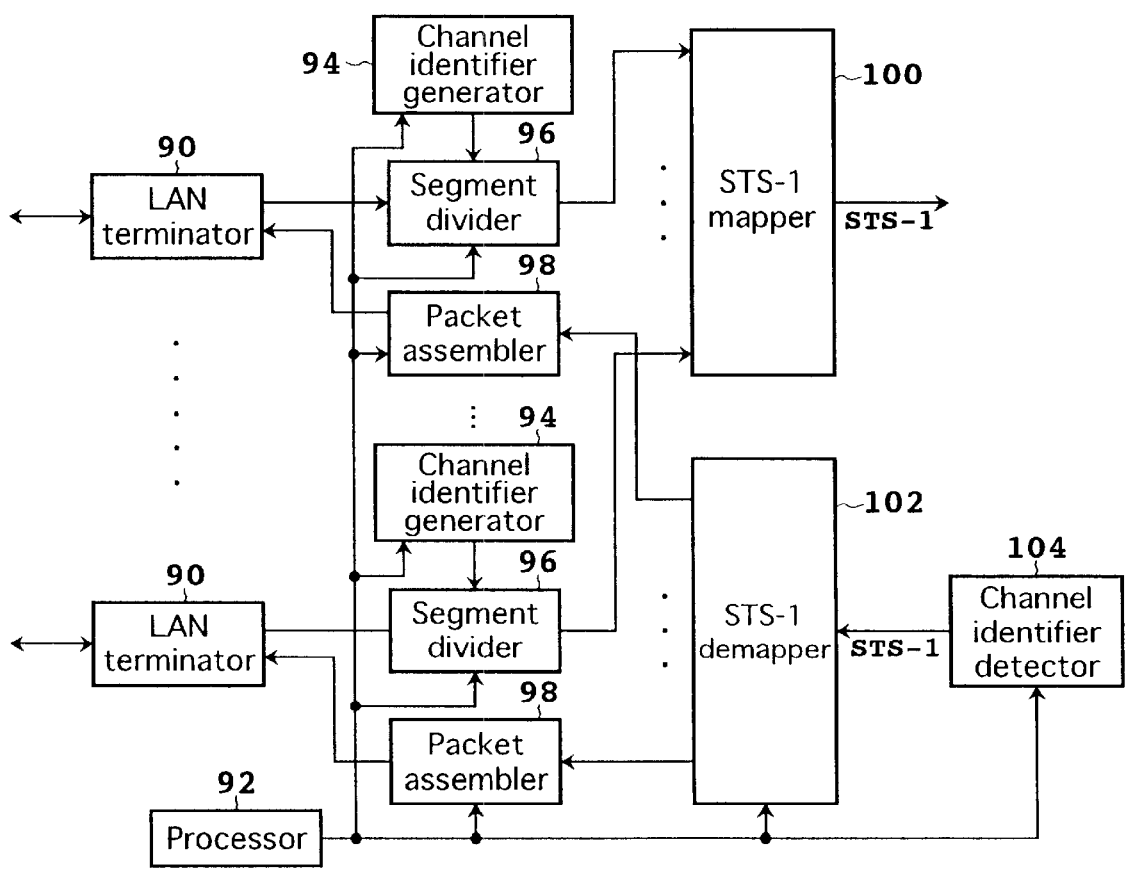
FIG. 10 is a block diagram of a LAN interface module in FIG. 4.

FIG. 10 is a block diagram of the LAN interface module included in FIG. 4. As shown in this diagram, the LAN interface module 32#n comprises a LAN terminator 90, a processor 92, a channel identifier generator 94, a segment divider 96, a packet assembler 98, an STS-1 mapper 100, an STS-1 demapper 102, and a channel identifier detector 104. The LAN terminator 90 terminates a LAN signal. The processor 92 outputs a signal to indicate whether the port ID is enable or disable, and executes conversion from the IP address of packet data into a VCI or conversion from the VCI preset in the ATM cell into an IP address. The channel identifier generator 94 generates, if the port ID is enable, a channel identifier #i relevant to the channel contained in the LAN interface module 32#n.

The channel identifier #i is substantially the same as the aforementioned one explained in relation to the DS1 interface module 32#4. In this example, four channels numbered ch#1–ch#4 are contained in the LAN interface module 32#n, and channel identifiers "00–11" are given to such channels ch#1–ch#4, respectively. The segment divider 96 divides each data packet, which is used for LAN signal, into ATM cells. Channel identifiers are inserted into the port ID areas of the ATM cells. Thereafter the VCI converted by the processor 92 is set in the headers of the ATM cells, and the packet data is converted into ATM cells, which are then outputted to the STS-1 mapper 100. Subsequently the STS-1 mapper 100 maps the ATM cells of multiple channels ch#1–ch#4 to the STS-1 signal, and then outputs the STS-1 signal to the STS switch module 34.

In case the signal outputted from the processor 92 indicates that the port ID is enable, the channel identifier detector 104 detects the channel identifier of the ATM cell mapped to the STS-1 signal. And if the detected channel identifier is coincident with any of the channel identifiers in use, the relevant ATM cell mapped to the STS-1 signal is outputted to the STS-1 demapper 102. Meanwhile, if the detected channel identifier is not coincident with any of the channel identifiers in use, the relevant ATM cell is discarded (i.e., the area of the relevant ATM cell is regarded as an idle cell), and the STS-1 signal is outputted to the STS-1 demapper 102. In another case where the signal outputted from the processor 92 indices that the port ID is disable, the STS-1 signal is outputted directly to the STS-1 demapper 102. Subsequently the STS-1 demapper 102 demaps the STS-1 signal obtained from the STS switch module 34 into each ATM cell, and outputs the same to the packet assembler 98 of the channel corresponding to the channel identifier inserted into the relevant ATM cell. The packet assembler 98 assembles the ATM cells into packet data and outputs the same to the LAN terminator 90, which then sends the packet data to the ethernet.

Figure 11:
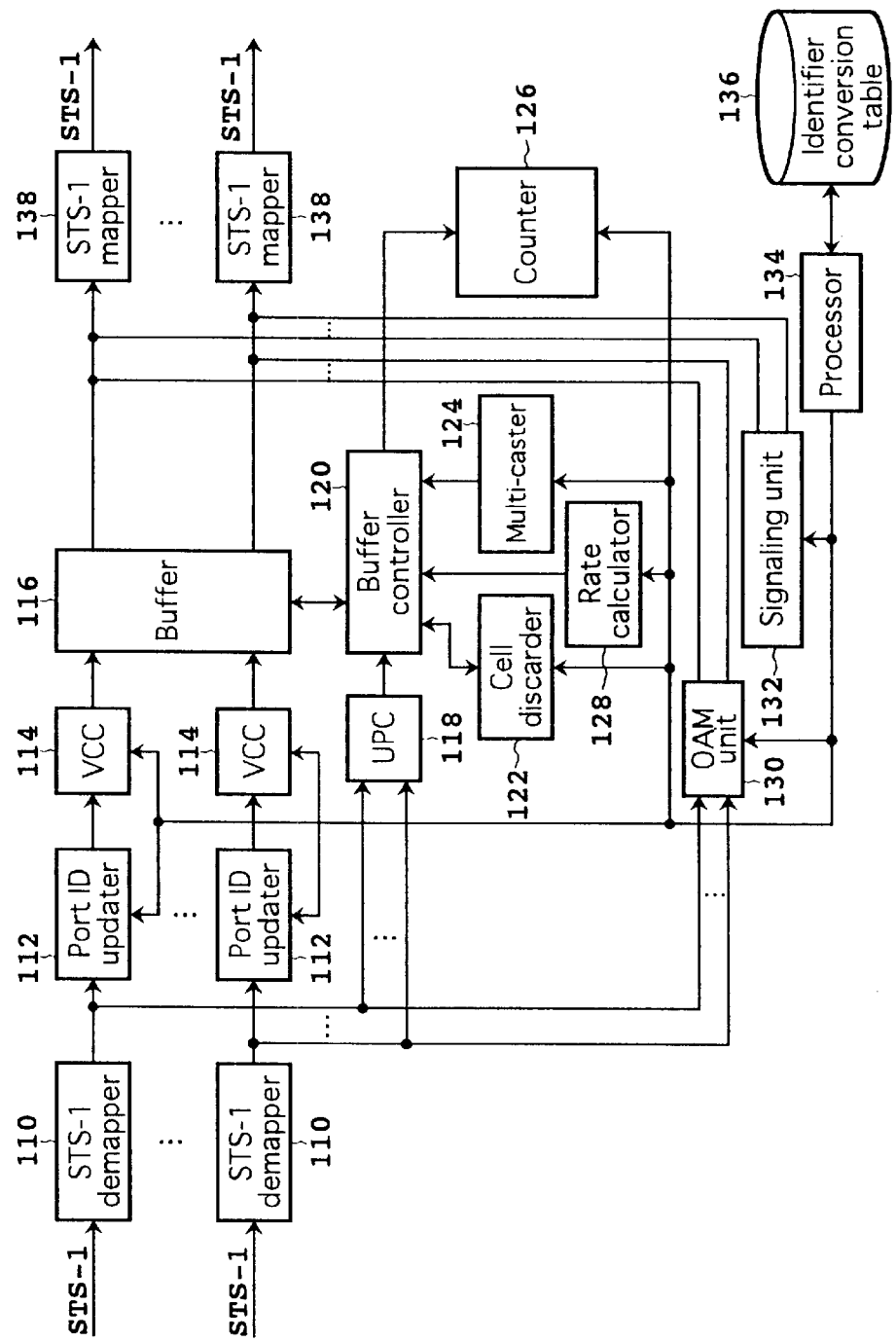
FIG. 11 is a block diagram of an ASF in FIG. 4.

FIG. 11 is a block diagram of the ASF included in FIG. 4. As shown in this diagram, the ASF 38 comprises an STS-1 demapper 110, a port ID updater 112, a VCC 114. A buffer 116, a UPC (Usage Parameter Control) 118, a buffer controller 120, a cell discarder 122, a multi-caster 124, a counter 126, a rate calculator 128, an OAM (Operation Administration and Maintenance) unit 130, a signaling unit 132, a processor 134, an identifier conversion table 136, and an STS-1 mapper 138. The STS-1 demapper 110 demaps the STS-1 signal obtained from the STS switch module 34 into each ATM cell, and outputs the same to the port ID updater 112. In case the port ID is enable and the STS-1 contains multiple channels, the port ID updater 112 checks the channel identifier of the input ATM cell and then updates the port ID to VPI/VCI for output use. When the output STS-1 signal contains multi-channel ATM cells mapped thereto, the port ID updater 112 inserts output channel identifiers in the port ID areas of the ATM cells and then outputs the same to the VCC 114.

In response to a command from the processor 134, the VCC 114 outputs each ATM cell to the corresponding buffer 116. In the buffer 116, areas for storing the ATM cells are secured per output port from which the STS-1 signal is outputted, and the ATM cells are written in the buffer 116 or are read out therefrom in response to commands from the buffer controller 120. The UPC 118 counts each VC traffic by means of the counter 126, and operates the cell discarder 122 in accordance with the preset information to thereby discard the cell or change the CLP (Cell Loss Priority). The rate calculator 128 collects various statistic information. The multi-caster 124 executes a process of point-to-multipoint topology. The OAM unit 130 receives an OAM cell and notifies the processor 134 of the OAM information, or converts the OAM information obtained from the processor 134 into an OAM cell and outputs the same to the cell mapper 138. The signaling unit 132 receives a signaling cell and notifies the processor 134 of the signaling information, or converts the signaling information obtained from the processor 134 into a signaling cell and then outputs the same to the cell mapper 138.

The processor 134 has the following functions.

(1) In response to the information preset in an unshown table per input port of the ASF 38, the processor 134 sends a command to the port ID updater 112 to indicate whether the port ID is enable or disable. The port ID is enable when the input STS-1 signal holds multi-channel ATM cells mapped thereto, or when the input STS-1 signal holds one-channel ATM cells mapped thereto and the validity of the ATM cell is to be checked. The port ID is disable in any other case than the above.

(2) When the input STS-1 signal supplied to the input port of the ASF 38 holds multi-channel ATM cells, the processor 134 searches the identifier conversion table 136 with reference to an index represented by the channel identifier inserted in each ATM cell mapped to the STS-1 signal and also by the input port number of the ASF 38, and informs the VCC 114 on the output port number of the relevant ATM cell.

(3) When the input STS-1 signal supplied to the input port of the ASF 38 holds one-channel ATM cells, the processor 134 searches the identifier conversion table 136 with reference to an index represented by the VPI/VCI of each ATM cell mapped to the STS-1 signal, and informs the vcc 114 on the output port number of the relevant ATM cell.

(4) When the output STS-1 signal supplied to the output port of the ASF 38 holds multi-channel ATM cells, the processor 134 informs the port ID updater 112 on the output channel identifier in the port ID area of each ATM cell mapped to the STS-1 signal and also on the output VPI/VCI.

(5) When the output STS-1 signal supplied to the output port of the ASF 38 holds one-channel ATM cells, the processor 134 informs the port ID updater 112 on the output VPC/VCI of each ATM cell mapped to the STS-1 signal.

(6) The processor 134 controls the OAM unit 130, the signaling unit 132, the UPC 118, the rate calculator 138 and the multi-caster 124.

FIG. 12 shows the contents of the identifier conversion table in FIG. 11. As shown in this diagram, the identifier conversion table 136 includes some items such as input port numbers of the ASF 38 to which the STS-1 signal is inputted (channel identifiers #1 are given to input port numbers in case the STS-1 signal holds multi-channel ATM cells mapped thereto), input VPI/VCI of the ATM cells mapped to the STS-1 signal (channel identifiers #j relevant to the channels of the output ATM cells are given in case the STS-1 signal holds multi-channel ATM cells), and output VPI/VCI.

For example, with regard to an ATM cell mapped to OC-12 to be inputted to the interface module 32#1, there are registered, in the identifier conversion table 136, input port number=#1, input VPI/VCI of the ATM cell and, in case the ATM cell is outputted to channel ch#1 of the interface module 32#4, output port number #4–ch#1 and output VCI of the ATM cell. Similarly, with regard to an ATM cell to be inputted to channel ch#1 of the interface module 32#4, there are registered, in the identifier conversion table 136, input port number=#4–ch#1, input VPI/VCI of the ATM cell and, in case the ATM cell is outputted to the interface module 32#1, output port number=#1 and output VPI/VCI of the ATM cell.

Hereinafter the operation of the transmitter shown in FIG. 4 will be described.

Figure 13:
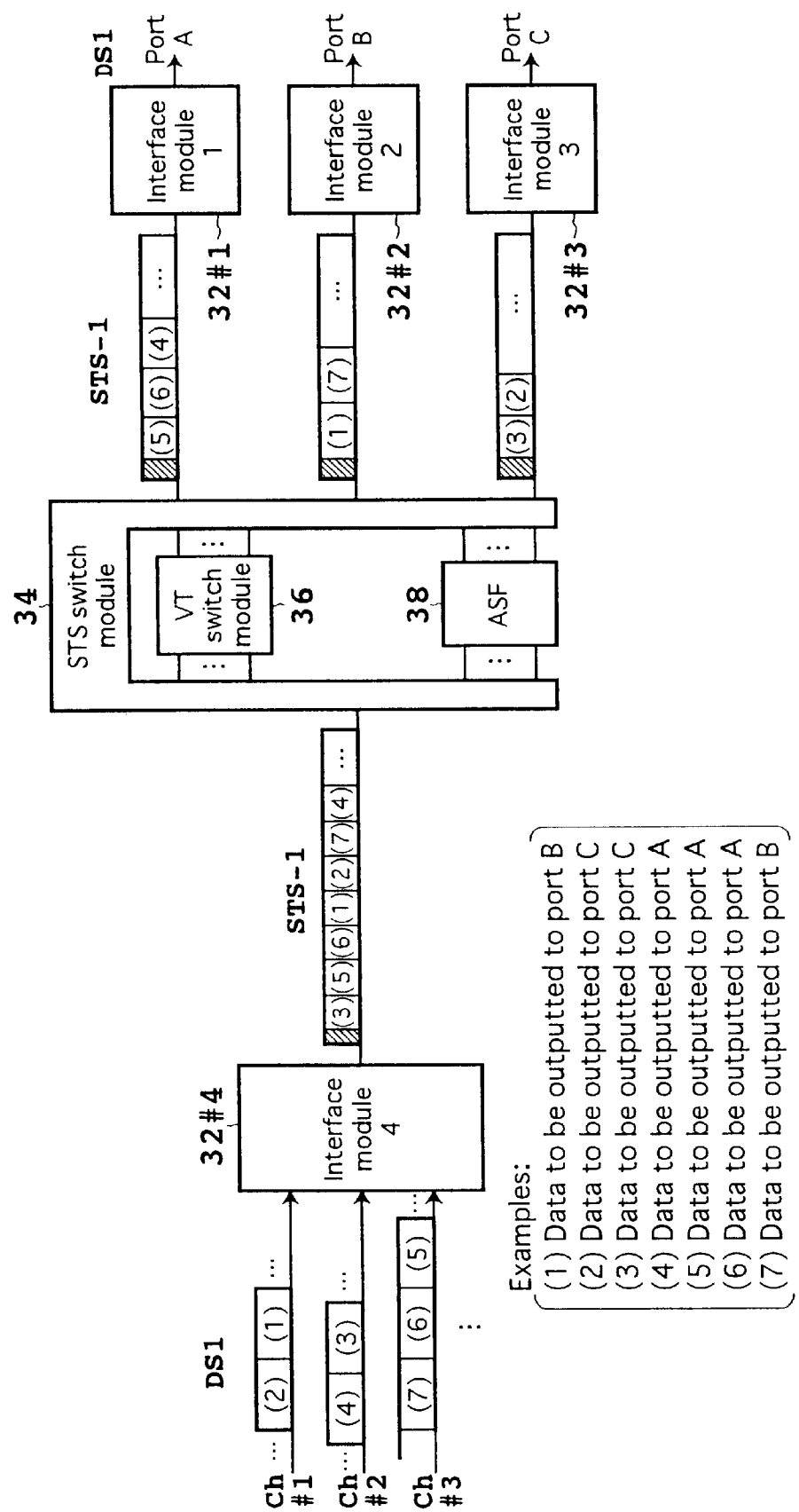
FIG. 13 is an explanatory diagram of the operation performed in FIG. 4.

(A) In outputting ATM cells from multi-channel interface module 32#4 to one-channel interface module 32#1 and so forth:

FIG. 13 is an explanatory diagram relative to the operation performed in the transmitter of FIG. 4 when ATM cells are outputted from the interface module 32#4 to the interface modules 32#1, 32#2 and 32#3.

(1) Operation of DS1 interface module 32#4 in FIG. 5

Figure 14:
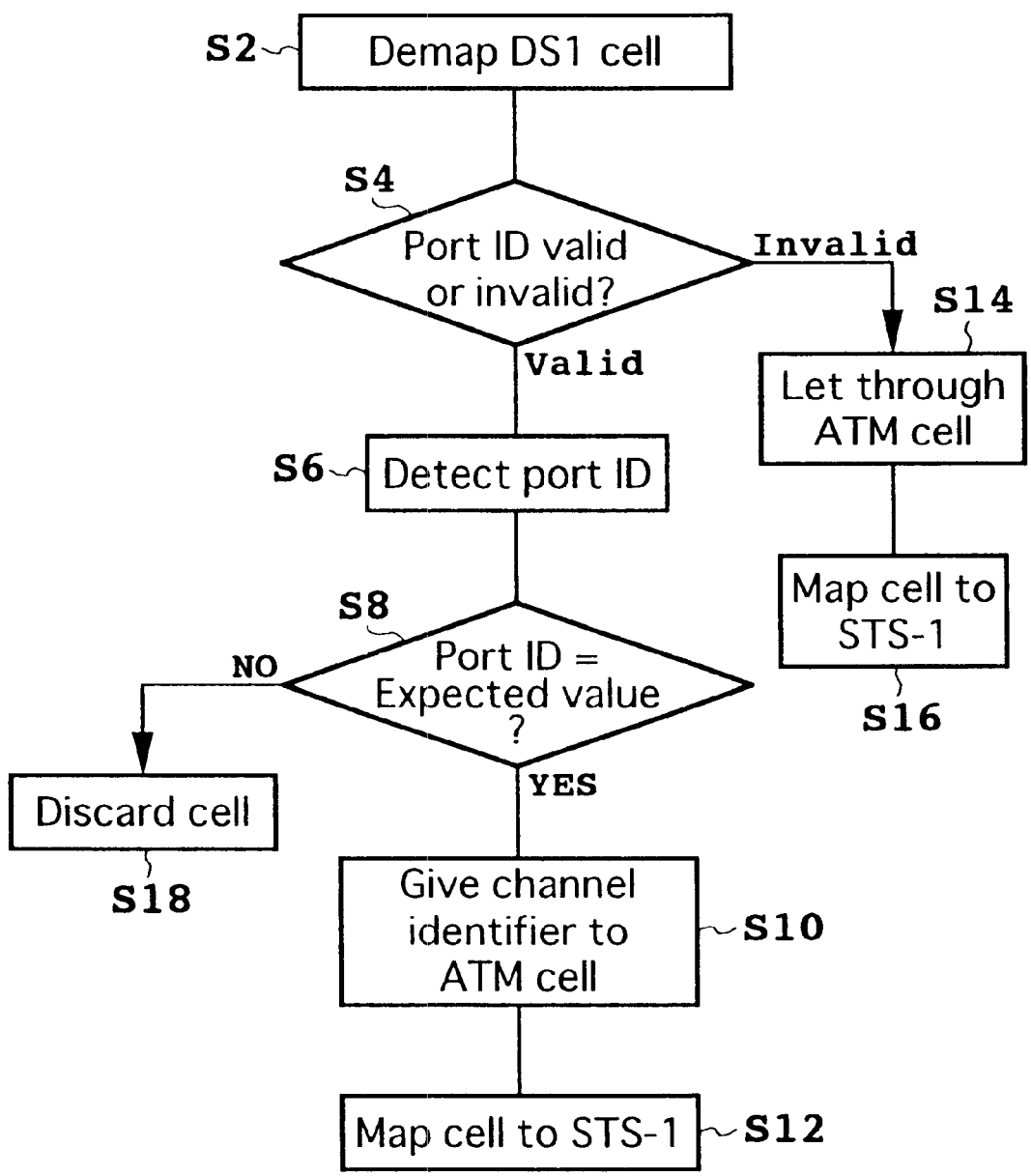
FIG. 14 is a flowchart showing the operation of the DS1 interface module (up)

FIG. 14 is a flowchart showing the operation of the DS1 interface module in FIG. 5. The DS1 interface module 32#4 contains 14 DS1 channels numbered ch#1–ch#14. The DS1 line terminator 50 containing each DS1 channel receives a DS1 frame from the DS1 network and then outputs the same to the DS1 demapper 52. At step S2 in FIG. 14, the DS1 demapper 52 demaps the mapped ATM cell in synchronism with the DS1 frame and outputs the cell to the port ID detector 54. In response to a command from the centralized control module 40 in FIG. 4, the port ID controller 58 indicates whether the port ID is enable or disable. Since the interface module 32#4 contains multiple DS1 channels in this example, the port ID is enable.

At step S4, the port ID detector 54 makes a decision as to whether the port ID is enable or disable. And if the result of this decision signifies that the port ID is enable, the operation proceeds to step S6. Meanwhile, if the above result signifies that the port ID is disable, the operation proceeds to step S14. At step S6, the port ID detector 54 detects the port ID in synchronism with the input ATM cell. Thereafter at step S8, a check is executed as to whether the port ID of the ATM cell is coincident or not with the expected value (e.g., ch#0="0000"), and if the result signifies a coincidence with the expected value, the operation proceeds to step S10. Meanwhile, if the above result signifies a noncoincidence with the expected value, the operation proceeds to step S18. At step S10, the channel identifier inserter 56 inserts the channel identifier #i, which is attached to the DS1 channel relevant to the input ATM cell, into the port ID area and then outputs the ATM cell to the STS-1 mapper 60.

At step S12, the STS-1 mapper 60 successively stores the input ATM cells in unshown buffers provided for the channels respectively, then reads out the stored ATM cells cyclically from the entire buffers and, after successively mapping the ATM cells to the STS-1 signal, outputs the same to the STS switch module 34. Even in case the ATM cells of any DS1 channel are sparse and the relevant buffer is rendered temporarily empty, this buffer is skipped over and the ATM cells are read out from the non-empty buffer of some other channel. More specifically, the ATM cells are mapped closely to the STS-1 signal in such a manner as not to be idle, whereby the efficiency of using the STS-1 signal is not deteriorated despite any nonuniform density in the DS1 channels.

Figure 15:
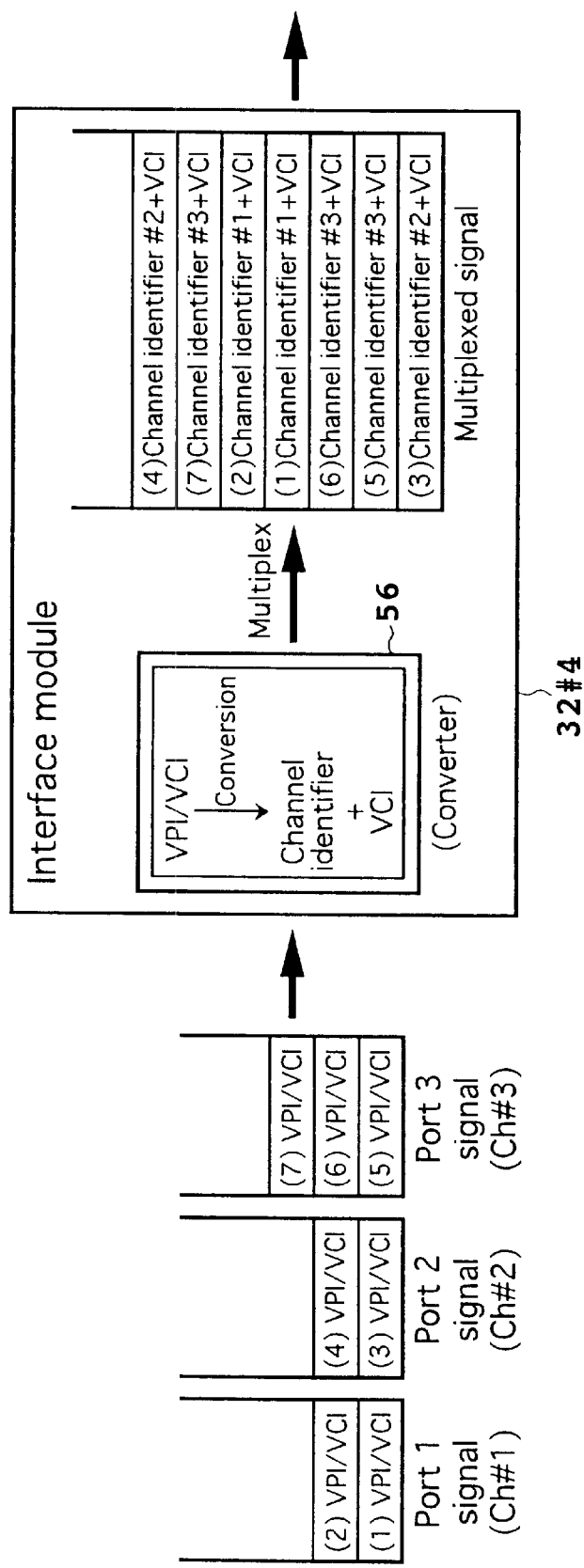
FIG. 15 is an explanatory diagram of the operation performed in FIG. 4.

For example, as shown in FIG. 15, a channel identifier #1 is inserted into ATM cells (1) and (2) inputted from port 1 of channel ch#1; a channel identifier #2 is inserted into ATM cells (3) and (4) inputted from port 2 of channel ch#2; and a channel identifier #3 is inserted into ATM cells (5), (6) and (7) inputted from port 3 of channel ch#3. These ATM cells are mapped to the STS-1 signal and then are outputted to the STS switch module 34 shown in FIG. 13. At step S14, since the port ID is disable, the port ID detector 54 and the channel identifier inserter 56 successively let through the input ATM cells and output the same to the STS-1 mapper 60. Subsequently at step S16, the STS-1 mapper 60 inputs ATM cells from a specific channel and, after mapping the ATM cells to the STS-1 signal, outputs the same to the STS switch module 34. If the port ID of the input ATM cell is not coincident with the expected value, the ATM cell is discarded at step S18.

(2) Operations of STS switch module 34 and VT switch module 36.

In accordance with the routing information, the STS switch module 34 outputs the STS-1 signal to the relevant input port of the VT switch module 36 in case the STS-1 signal inputted from the interface modules 32#1–32 #n holds the mapped VT frame. Meanwhile, in case the STS-1 signal holds the mapped ATM cells, the STS switch module 34 outputs the STS-1 signal to the relevant input port of the ASF switch module 38. Subsequently the VT switch module 36 cross-connects the VT signal in accordance with the routing information and, after multiplexing the VT signal to the STS-1 signal per output port, supplies the multiplexed signals to the STS switch module 34.

(3) Operation of ASF 38

Figure 16:
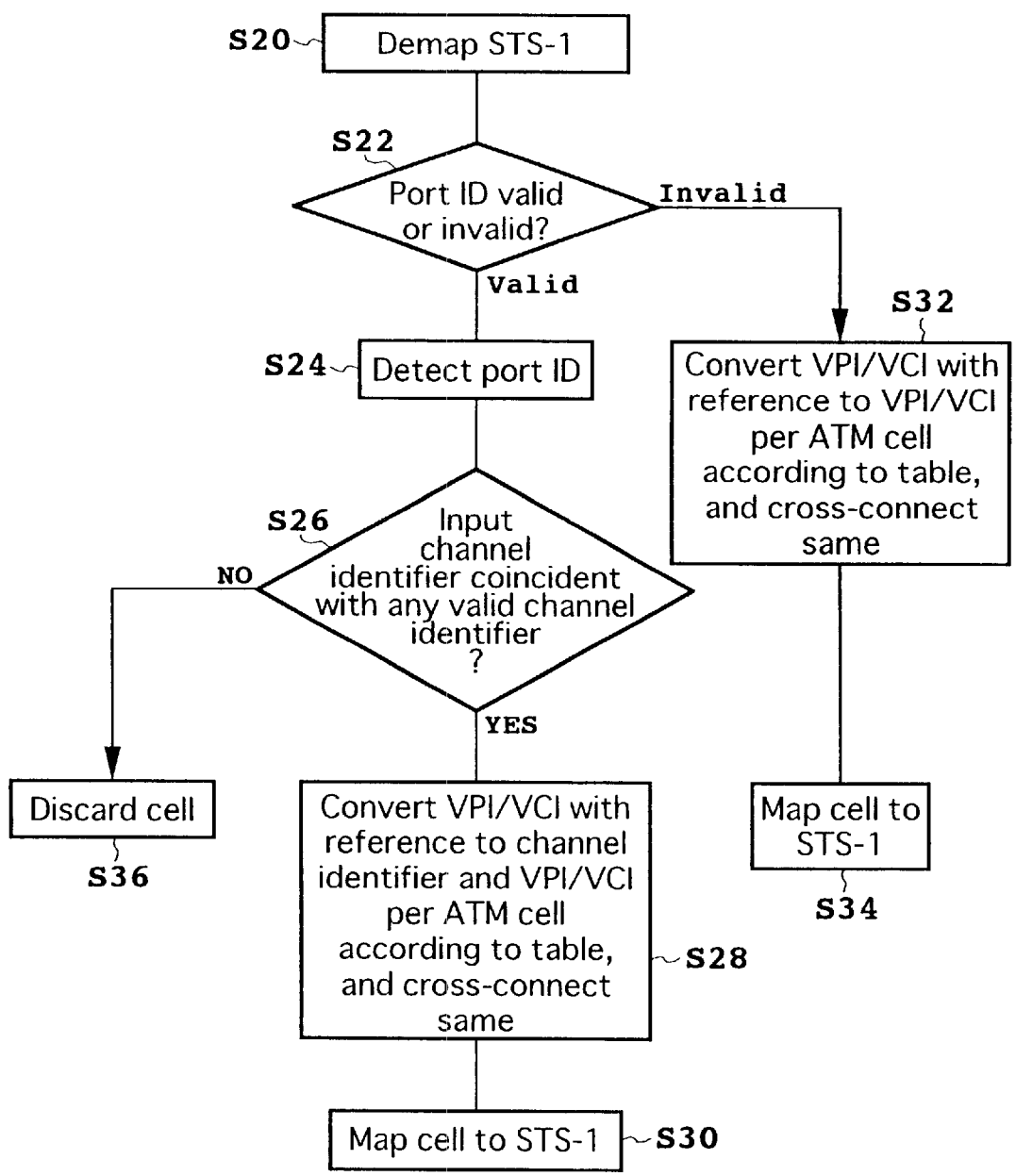
FIG. 16 is a flowchart showing the operation of the ASF.

FIG. 16 is a flowchart showing the operation of the ASF. At step S20, the STS-1 demapper 110 demaps the STS-1 signal obtained from each input port of the ASF 38 into ATM cells. The processor 134 informs the port ID updater 112 on whether the port ID preset in an unshown table with regard to each input port of the ASF 38 is enable or disable. In this example where the STS-1 signal outputted from the interface module 34#4 contains multiple channels, the port ID relative to the STS-1 input port is enable. Subsequently at step S22, the port ID updater 112 executes a check as to whether the port ID is enable or disable, and if the result signifies that the port ID is enable, the operation proceeds to step S24. Meanwhile, if the above result signifies that the port ID is disable, the operation proceeds to step S32. At step S24, the port ID updater 112 detects the port ID in synchronism with the ATM cell.

Thereafter at step S26, the port ID updater 112 executes a check as to whether the input channel identifier of the port ID area is coincident with any of the valid channel identifiers (relative to the ATM cells held in the STS-1 signal). And if the result of such a check signifies a coincidence, the operation proceeds to step S28. Meanwhile, if the above result signifies no coincidence, the operation proceeds to step S36. And at step S28, the processor 134 searches the identifier conversion table 136 with reference to an index of the input port number (including the channel identifier) and the VCI of the ATM cell, and then supplies the output VPI/VCI to the port ID updater 112 while supplying the output port number to the VCC 114. The port ID updater 112 inserts the output VPI/VCI into the header of the ATM cell and then outputs the ATM cell to the VCC 114. Subsequently the VCC 114 supplies the ATM cell to the buffer 116 corresponding to the output port number. At step S30, the STS-1 mapper 138 maps to the STS-1 signal the ATM cells stored in the buffer 116 corresponding to the output port, and then supplies the STS-1 signal from the output port to the interface modules 32#1, 32#2 and 32#3 via the STS switch module 34.

For example, as shown in FIG. 13, ATM cells (5), (6) inputted to DS1 channel ch#3, and ATM cell (4) inputted to DS1 channel ch#2, are outputted to the interface module 32#1.

ATM cell (1) inputted to DS1 channel ch#1, and ATM cell (7) inputted to DS1 channel ch#3, are outputted to the interface module 32#2. Also ATM cell (2) inputted to DS1 channel ch#1, and ATM cell (4) inputted to DS1 channel ch#2, are outputted to the interface module 32#3. At step S32, the processor 134 searches the identifier conversion table 136 with reference to an index of the input port number and the VPI/VCI of each ATM cell, and then supplies the output VPI/VCI to the port ID updater 112 while supplying the output port number to the VCC 114. The port ID updater 112 inserts the output VPI/VCI into the header of the ATM cell and then outputs the ATM cell to the VCC 114. Subsequently the VCC 114 supplies the ATM cell to the buffer 116 corresponding to the output port number. At step S34, the STS-1 mapper 138 maps to the STS-1 signal the ATM cells stored in the buffer 116 corresponding to the output port, and then supplies the STS-1 signal from the output port to the STS switch module 34. And at step S36, the port ID updater 112 discards the cells.

(4) operations of interface modules 32#1, 32#2, 32#3

Figure 17:
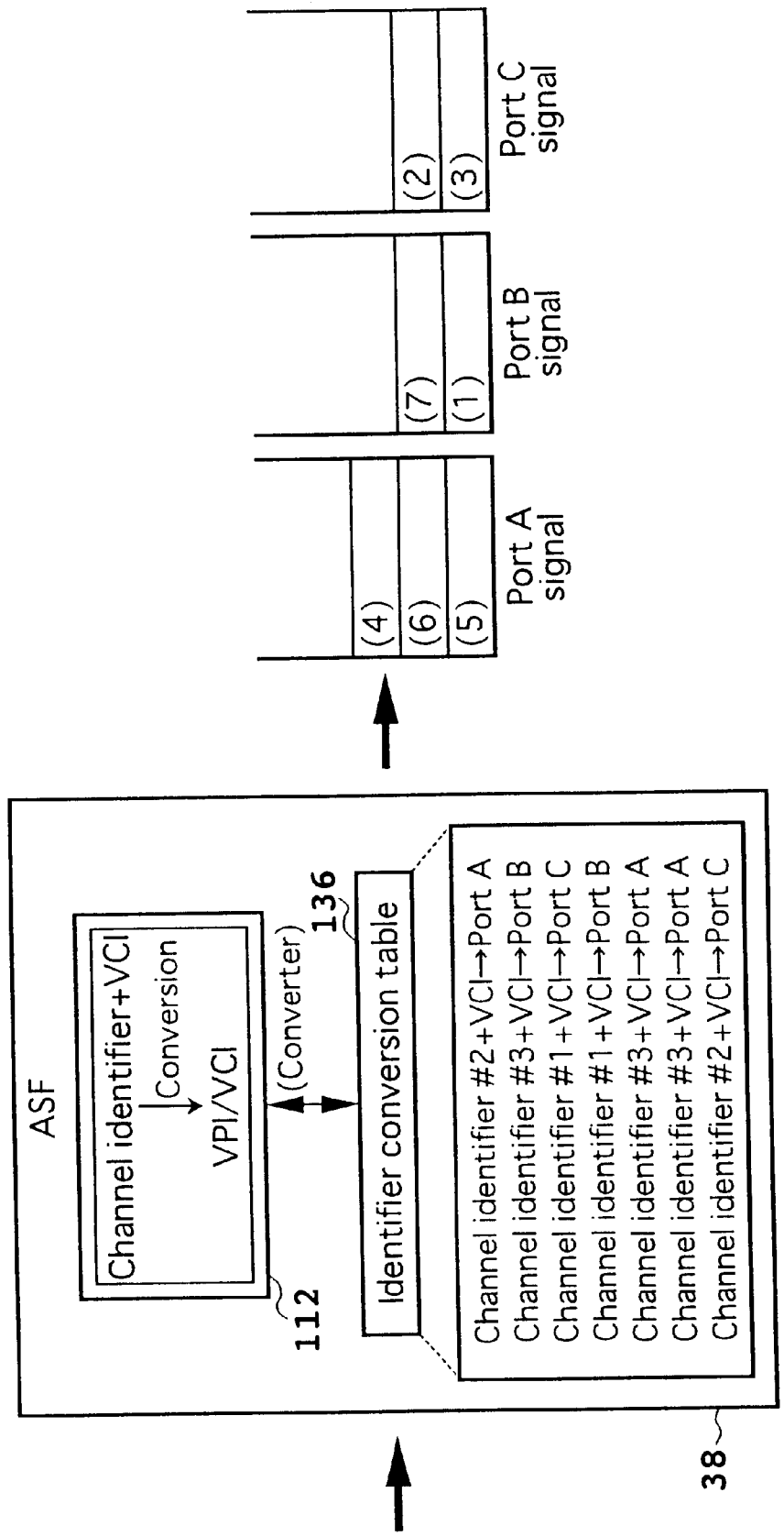
FIG. 17 is an explanatory diagram of the operation performed in FIG. 4.

The interface modules 32#1, 32#2, 32#3 convert the input STS-1 signal in conformity with external OC-12, OC-3c, DS3 interfaces and then outputs the same to ports A, B, C. For example, as shown in FIG. 17, ATM cells (5), (6), (4) are outputted to the port A of the interface module 32#1; ATM cells (1), (7) are outputted to the port B of the interface module 32#2; and ATM cells (3), (2) are outputted to the port C of the interface module 32#3, respectively. Thus, even in the case of such STS-1 signal where multi-channel ATM cells are mapped, each ATM cell of the multiple channels is delivered from the desired relevant output port.

Figure 18:
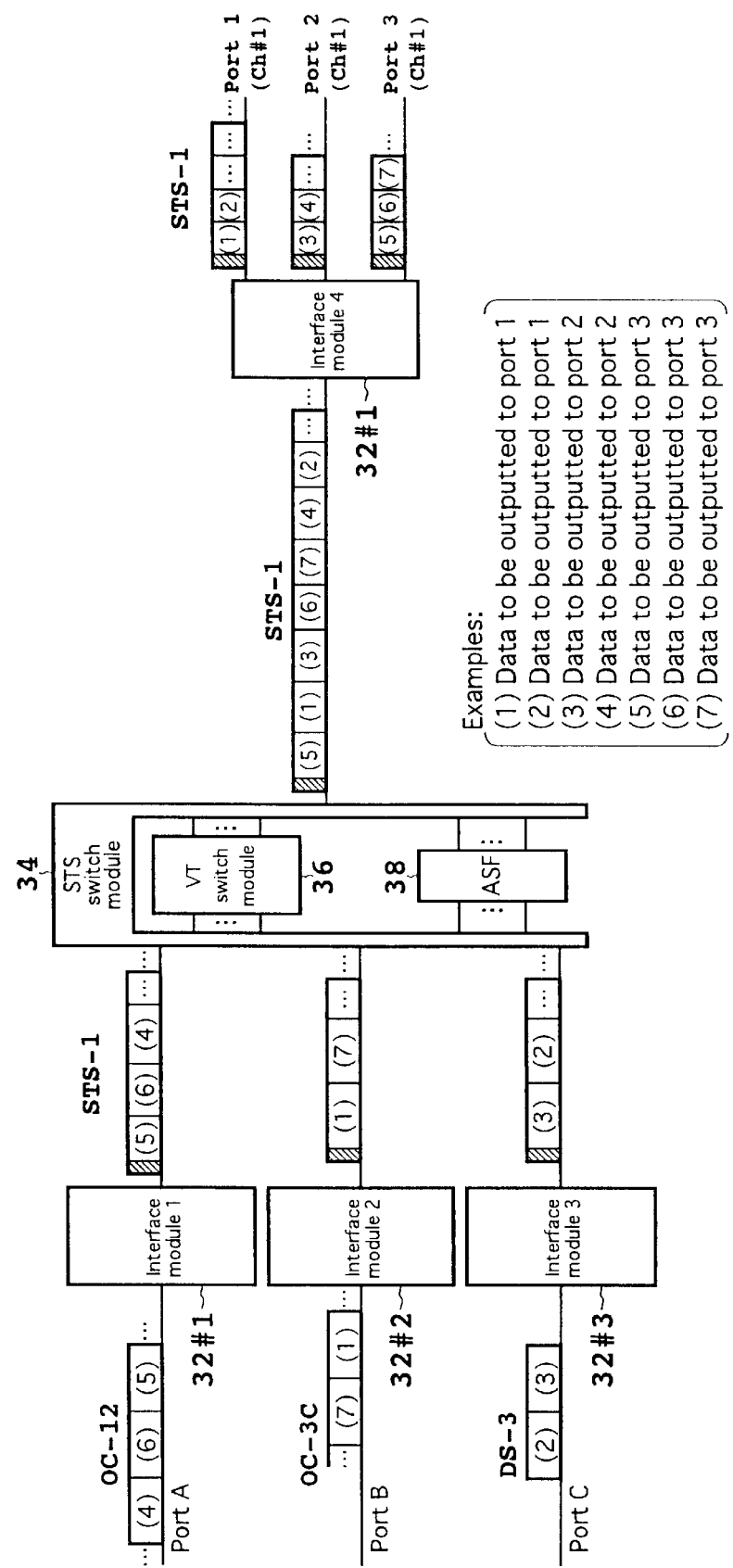
FIG. 18 is another explanatory diagram of the operation performed in FIG. 4.

(B) In outputting ATM cells from one-channel interface modules 32#1, 32#2. 32#3 to multi-channel interface module 32#4:

FIG. 18 is an explanatory diagram relative to the operation performed in the transmitter of FIG. 4 when ATM cells are outputted from the interface modules 32#1, 32#2 and 32#3 to the interface module 32#4.

(1) Operations of interface modules 32#1, 32#2, 32#3 and STS switch module 34

The interface modules 32#1, 32#2 and 32#3 demap the ATM cells which are mapped to the OC-12, OC-3c and DS3 respectively, and after mapping the ATM cells to the STS-1 signal, outputs the same to the STS switch module 34. None of the one-channel interface modules 32#1, 32#2, 32#3 inserts any channel identifier. The STS switch module 34 cross-connects each input STS-1 signal in accordance with the routing information, and then outputs the same to the corresponding input port of the ASF 38.

(2) Operation of ASF 38

Figure 19:
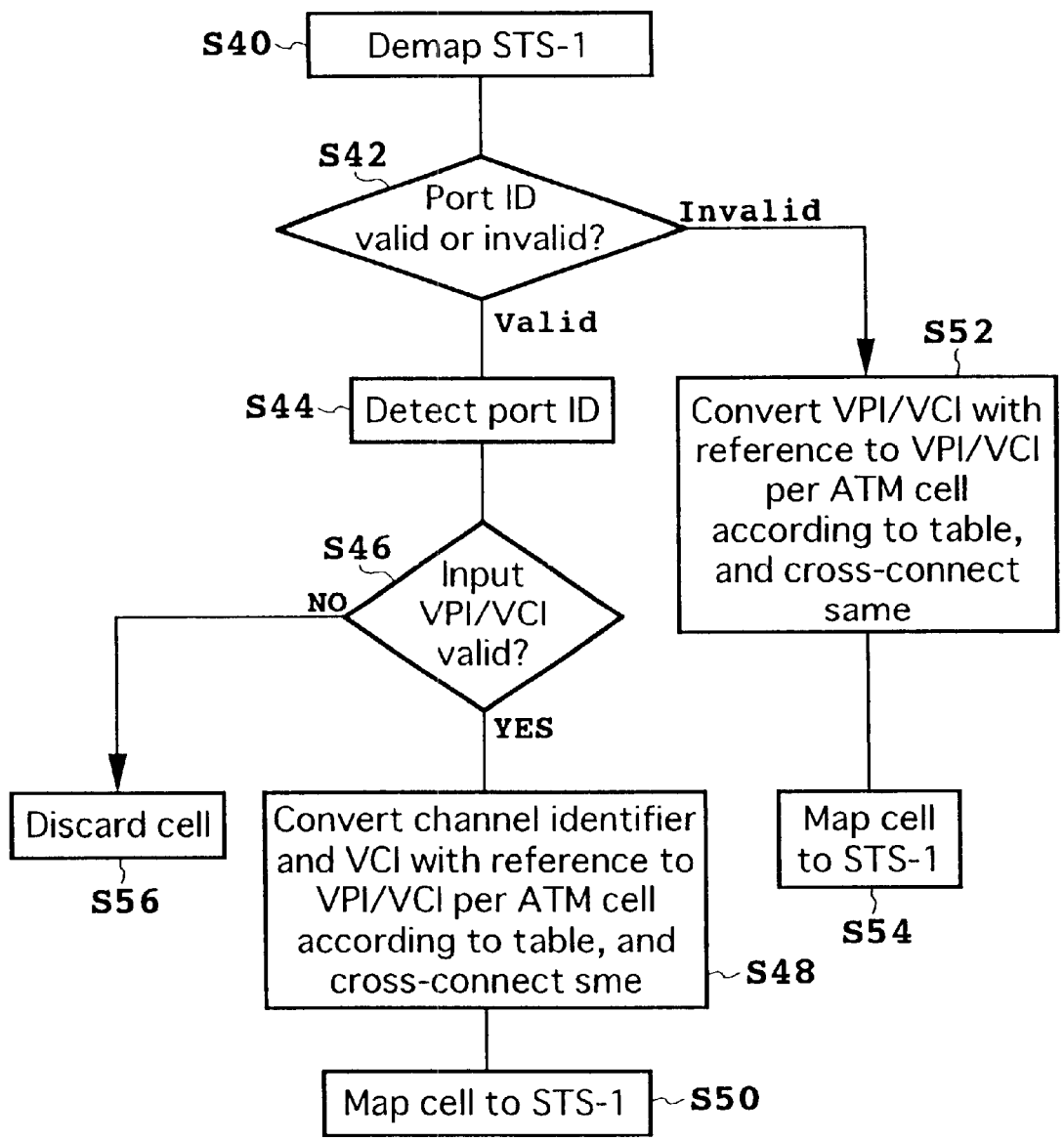
FIG. 19 is a flowchart showing the operation of the ASF.

FIG. 19 is a flowchart showing the operation of the ASF. At step S40, the STS-1 demapper 110 demaps the STS-1 signal obtained from each input port into ATM cells. Thereafter at step S42, the port ID updater 112 executes a check as to whether the port ID is enable or disable, and if the result signifies that the port ID is enable, the operation proceeds to step S46. Meanwhile, if the above result signifies that the port ID is disable, the operation proceeds to step S52. At step S46, the port ID updater 112 executes a check as to whether the input VPI/VCI are valid or not, and if the result is affirmative to signify valid, the operation proceeds to step S48. Meanwhile, if the above result is negative to signify invalid, the operation proceeds to step S56. At step S48, the processor 134 searches the identifier conversion table 136 with reference to an index of the input port number of the ASF 38 relevant to the input ATM cell and also the VPI/VCI of the ATM cell, and then supplies the output VCI and the output channel identifier to the port ID updater 112 in case the ATM cell is the one mapped to the multi-channel STS-1 signal. Further the processor 134 supplies the output port number of the ATM cell to the VCC 114.

Figure 20:
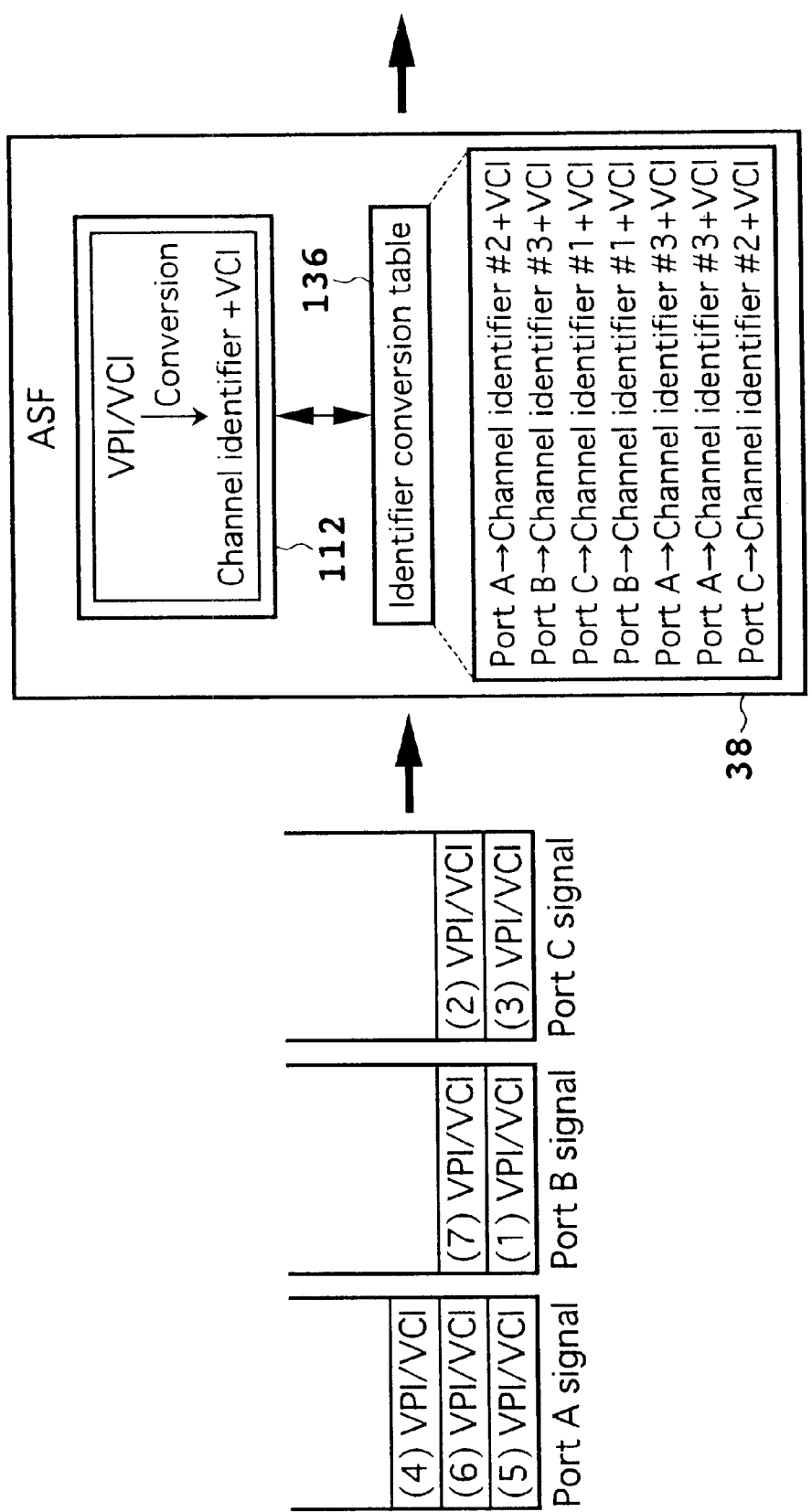
FIG. 20 is an explanatory diagram of the operation performed in FIG. 4.

The port ID updater 112 inserts the output channel identifier into the port ID area of the ATM cell while inserting the VCI into a predetermined area of the header, and then outputs the ATM cell to the VCC 114. Subsequently the VCC 114 supplies the ATM cell to the buffer 116 corresponding to the output port number. At step S50, the STS-1 mapper. 138 maps to the STS-1 signal the ATM cells stored in the buffer 116 corresponding to the output port, and then supplies the STS-1 signal from the output port via the STS switch module 34 to the interface module 32#4. For example, as shown in FIG. 20, a channel identifier #1 of the interface module 32#4 is inserted into the port ID area with regard to the ATM cell (1) inputted from the interface module 32#2 and the ATM cell (2) inputted from the interface module 32#3.

With regard to the ATM cell (3) inputted from the interface module 32#3 and the ATM cell (4) inputted from the interface module 32#1, a channel identifier #2 of the interface module 32#4 is inserted into the port ID area. Also with regard to the ATM cells (5), (6) inputted from the interface module 32#1 and the ATM cell (7) inputted from the interface module 32#2, a channel identifier #3 of the interface module 32#4 is inserted into the port ID area. Such ATM cells (1)–(7) are mapped to the same STS-1 signal. At step S52, the processor 134 searches the identifier conversion table 136 with reference to an index of the input port number and the VPI/VCI of the ATM cell, and then supplies the output VPI/VCI to the port ID updater 112 while supplying the output port number to the VCC 114. Thereafter the port ID updater 112 inserts the output VPI/VCI into the header of the ATM cell and then outputs the ATM cell to the vcc 114.

Subsequently the VCC 114 supplies the ATM cell to the buffer 116 corresponding to the output port number. At step S54, the STS-1 mapper 138 maps to the STS-1 signal the ATM cells stored in the buffer 116 corresponding to the output port, and then supplies the STS-1 signal from the output port to the STS switch module 34. And at step S56, the port ID updater 112 discards the cells.

(3) Operation of DS1 interface module 32#4 in FIG. 9

Figure 21:
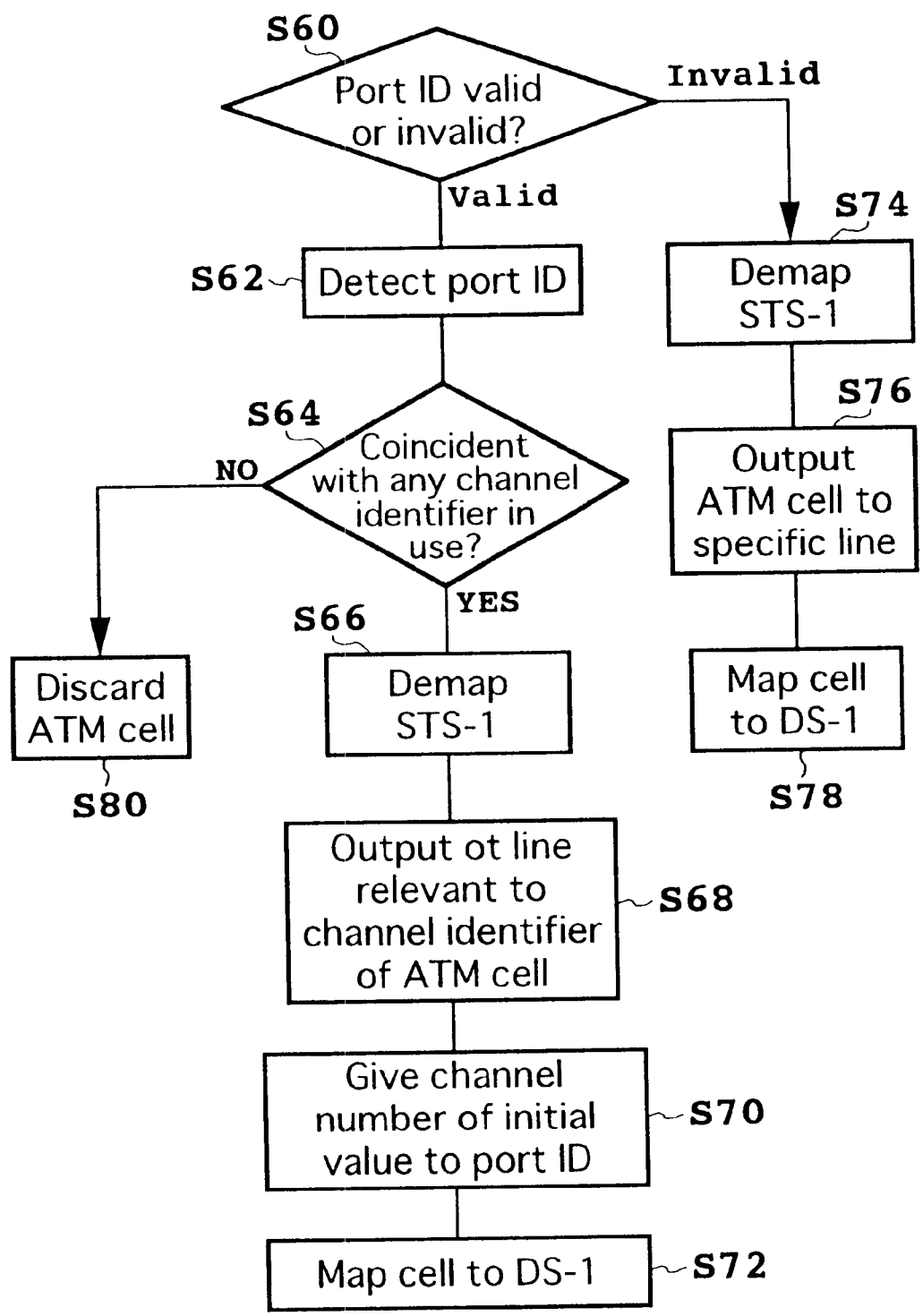
FIG. 21 is a flowchart showing the operation of the DS1 interface module (down)

FIG. 21 is a flowchart showing the operation of the DS1 interface module in FIG. 9. At step S60, the channel identifier detector 70 executes a check as to whether the port ID is enable or disable and, if the result signifies that the port ID is enable, the operation proceeds to step S62. Meanwhile, if the above result signifies that the port ID is disable, the operation proceeds to step S74. At step S62, the channel identifier detector 70 synchronizes the STS-1 signal with the frame and detects the port ID in synchronism with the ATM cell mapped to the STS-1 signal. At step S64, the channel identifier detector 70 executes a check as to whether the channel identifier inserted into the port ID area is coincident with any of the channels in use (e.g., #1–#14) and, if the result signifies a coincidence, the operation proceeds to step S66. Meanwhile, if the result signifies no coincidence, the operation proceeds to step S80.

Figure 22:
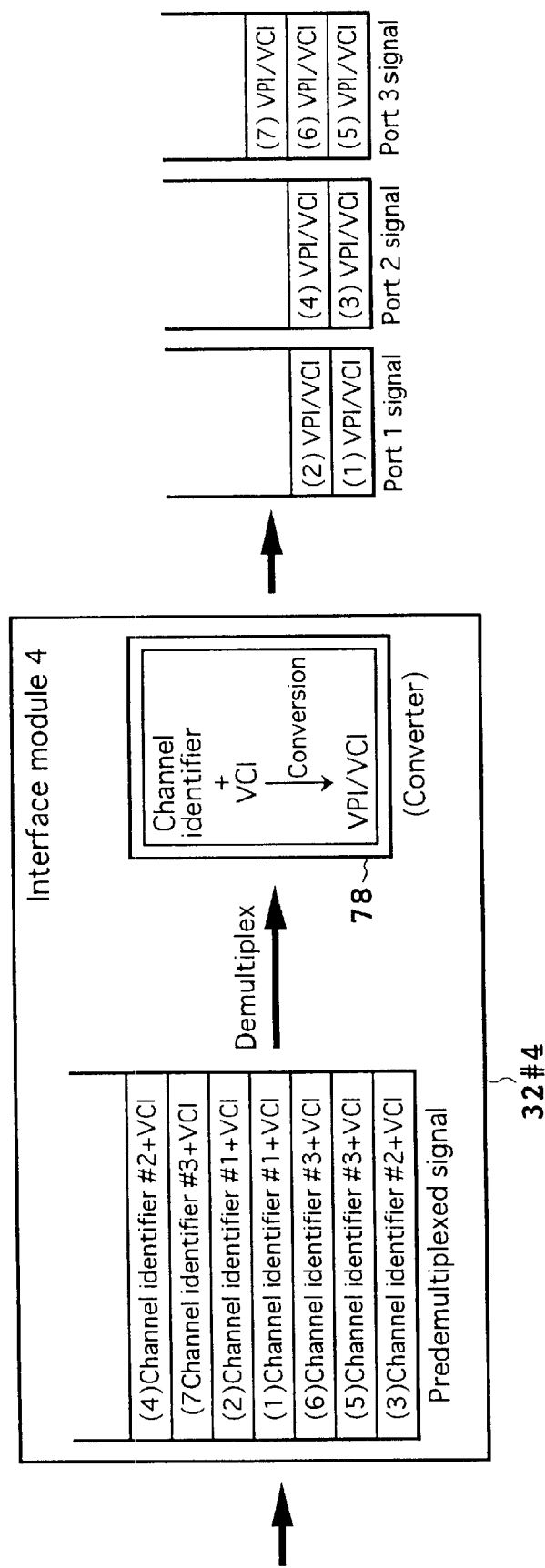
FIG. 22 is an explanatory diagram of the operation performed in FIG. 4.

At step S66, the STS-1 demapper 72 demaps the ATM cells mapped to the STS-1 signal. Next at step S68, the STS-1 demapper 72 outputs the ATM cell to the port ID inserter 78 of the line which corresponds to the channel identifier #1 inserted into the port ID area of the demapped ATM cell. Subsequently at step S70, the port ID inserter 78 inserts an expected value (e.g., "0000") into the port ID of the ATM cell and then outputs the same to the DS1 mapper 80. At step S72, the DS1 mapper 80 maps the ATM cells to the DS1 signal and then outputs the ATM cells from the DS1 line terminator 82 to the DS1 network. For example, as shown in FIG. 22, ATM cells (1), (2) are outputted to port 1 of channel ch#; ATM cells (3), (4) are outputted to port 2 of channel ch#2; and ATM cells (5), (6), (7) are outputted to port 3 of channel ch#3.

At step S74, in case the port ID is disable, the channel identifier detector 70 lets through the STS-1 signal and outputs the same to the STS-1 demapper 72, which then demaps the ATM cells mapped to the STS-1 signal. Subsequently at step S76, the STS-1 demapper 72 outputs the ATM cells to the port ID inserter 78 of a specific line. The port ID inserter 78 lets the ATM cells pass through and then outputs the same to the DS1 mapper 80. At step S78, the DS1 mapper 80 maps the ATM cells to the DS1 signal and outputs the ATM cells from the DS1 line terminator 82 to the DS3 network. Thereafter at step S80, the channel identifier detector 70 discards every ATM cell whose channel identifier is not coincident with any of the channels in use (i.e., any non-coincident ATM cell mapped to the STS-1 signal is regarded as an idle cell).

Figure 23:
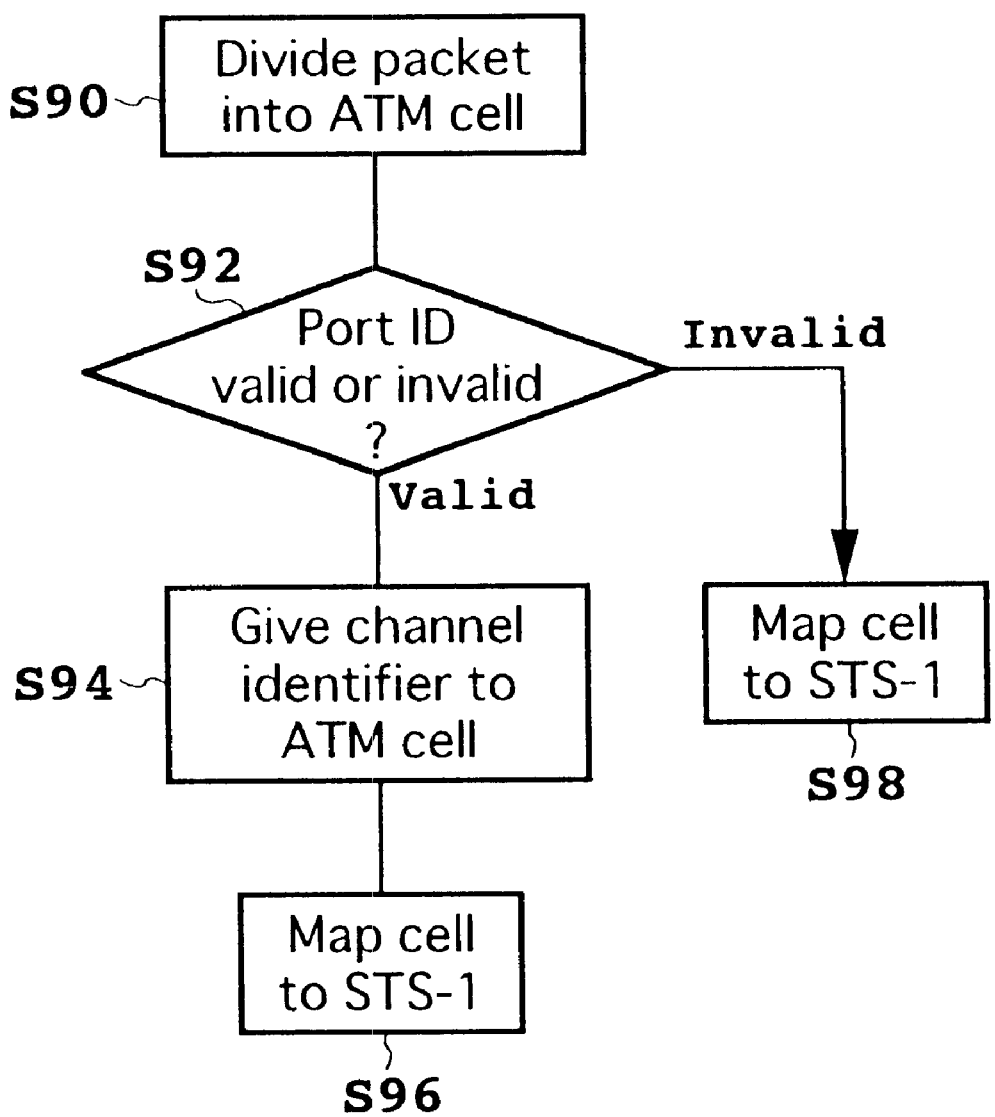
FIG. 23 is a flowchart showing the operation of the LAN interface module (up)

(C) Operation of interface module 32#n for LAN signal (1) Operation of up interface module 32#n FIG. 23 is a flowchart showing the operation of the up LAN interface module 32#n. The LAN terminator 90 in FIG. 10 receives packet data from an ethernet and outputs the same to the segment divider 96. The processor 92 converts the packet IP address into corresponding VPI/VCI and then outputs the VPI/VCI to the segment divider 96 while instructing the channel identifier generator 94 to indicate enable or disable. In response to an enable indication, the channel identifier generator 94 generates a corresponding channel identifier #1 and then outputs the same to the segment divider 96. At step S90, the segment divider 96 divides the packet data into ATM cells and inserts the VPI/VCI into the header of each ATM cell.

At step S92, the segment divider 96 executes a check as to whether the channel identifier #i is enable or disable. And if the result signifies enable, the operation proceeds to step S94. Meanwhile, if the above result signifies disable, the segment divider 96 outputs the ATM cell to the STS-1 mapper 100, and the operation proceeds to step S98. At step S94, the segment divider 96 inserts the channel identifier #i into the port ID and then outputs the same to the STS-1 mapper 100. At step S96, the STS-1 mapper 100 maps the ATM cells to the STS-1 signal and outputs the same to the STS switch module 34. At step S98, the STS-1 mapper 100 maps the ATM cells to the STS-1 signal and then outputs the same to the STS switch module 34. In the same manner as in the aforementioned case (B), the STS-1 signal holding the mapped ATM cells of multiple channels ch#1–ch#4 is inputted to the interface module 32#n.

Figure 24:
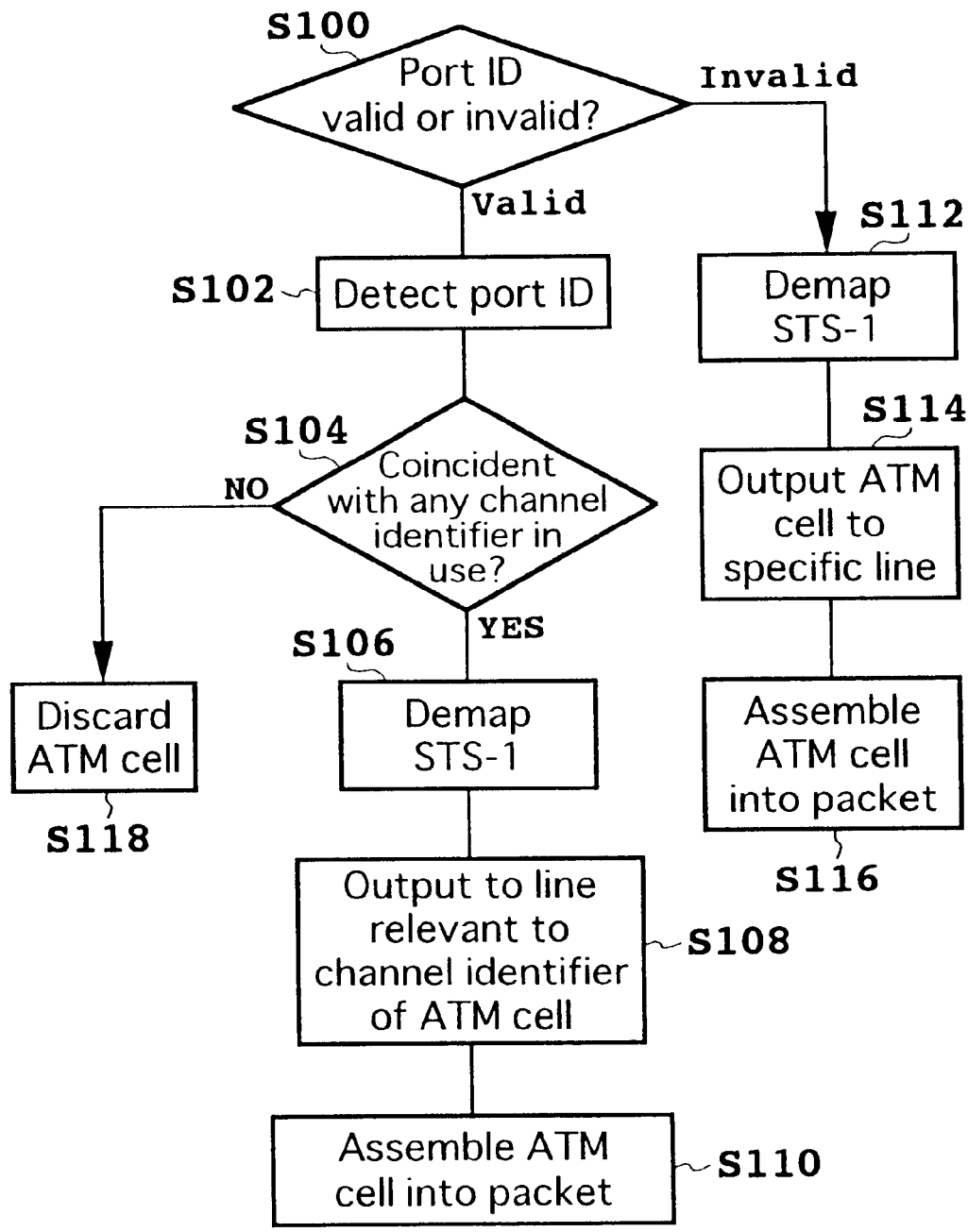
FIG. 24 is a flowchart showing the operation of the LAN interface module (down).

FIG. 24 is a flowchart showing the operation of the LAN interface module. At step S100, the channel identifier detector 104 executes a check as to whether the port ID is enable or disable and, if the result signifies enable, the operation proceeds to step S102. Meanwhile, if the above result signifies disable, the channel identifier detector 104 outputs the STS-1 signal to the STS-1 demapper 102, and then the operation proceeds to step S112. At step S102, the channel identifier detector 104 synchronizes the STS-1 signal with the frame and, in synchronism with each ATM cell, detects the port ID inserted into the ATM cell. Subsequently at step S104, the channel identifier detector 104 executes a check as to whether the channel identifier inserted into the port ID area is coincident with any of the channels (#1–#4) in use. And if the result signifies a coincidence, the operation proceeds to step S106. Meanwhile, if the above result signifies no coincidence, the operation proceeds to step S118.

At step S106, the STS-1 demapper 102 demaps the ATM cells mapped to the STS-1 signal. Thereafter at step S108, the STS-1 demapper 102 outputs the ATM cells corresponding to the channel identifier of the demapped ATM cells. And at step S110, the packet assembler 98 assembles the ATM cells into packet data and outputs the same to the LAN terminator 90, which then outputs the packet to the ethernet. Subsequently at step S112, the STS-1 demapper 102 demaps the ATM cells mapped to the STS-1 signal. At step S114, the STS-1 demapper 102 outputs the demapped ATM cells to a specific line.

At step S116, the packet assembler 98 assembles the ATM cells into a packet and outputs the same to the LAN terminator 90, which then outputs the packet to the ethernet. And at step S118, the channel identifier detector 104 discards the ATM cells.

According to the present invention, as described hereinabove, it is possible to route ATM cells to desired interface modules even in case each of the interface modules contains multiple channels. It is also possible to route ATM cells from any interface module to any network of an interface module containing multiple channels. Further, in case a synchronous frame signal holds ATM cells of multiple channels, any ATM cells can be mapped to desired areas of the synchronous frame instead of fixed assignment of channels to the synchronous frame signal, hence eliminating deterioration of the efficiency that may otherwise be derived, in the use of synchronous frame signal, from some nonuniform density of ATM cells in the individual channels.

What is claimed is:

1. A transmitter equipped with a cell switching function and having an interface module to serve as an interface between ATM cells and synchronous frames, said transmitter comprising:

a plurality of first physical paths for inputting ATM cells with channel identifiers given thereto to identify channels respectively;

a second physical path for outputting a synchronous frame signal;

channel identifier insertion means for inserting the channel identifiers, which are given to said first physical paths where the ATM cells are inputted, into predetermined areas of the ATM cells; and mapping means for mapping the multi-channel ATM cells, where the channel- identifiers are inserted, to one synchronous frame signal and outputting the same to said second physical path.

2. The transmitter according to claim 1, further comprising detection means which detects whether a predetermined value is set or not in the predetermined area of each ATM cell, and discards any ATM cell where the predetermined value is not set.

3. The transmitter according to claim 2, further comprising control means to generate a signal indicative of either enable or disable, wherein, when said signal indicates enable, said channel identifier insertion means inserts the channel identifier and said detection means detects the predetermined area; but when said signal indicates disable, said detection means does not detect the predetermined area and said channel identified insertion means does not insert the channel identifier, and outputs The ATM cell directly to said mapping means without any processing.

4. The transmitter according to claim 2, wherein said predetermined area includes a general flow control area.

5. A transmitter equipped with a cell switching function and having an interface module to serve as an interface between ATM cells and synchronous frames, said transmitter comprising:

a plurality of first physical paths for outputting ATM cells with channel identifiers given thereto to identify channels respectively;

a second physical path for inputting a synchronous frame signal where multi-channel ATM cells are mapped; and demapping means for demapping the ATM cells mapped to the synchronous frame signal and outputting the ATM cells to said first physical paths corresponding to the channel identifiers inserted into the predetermined areas of the ATM cells, and further comprising detection means which detect whether the value in the predetermined area of each ATM cell is coincident or not with any of the channel identifiers, wherein the ATM cell is discarded if the result of such detection signifies no coincidence with any of the channel identifiers, and channel identifier update means for inserting a predetermined value in the predetermined area of each ATM cell.

6. The transmitter according to claim 5, further comprising control means to generate a signal indicative of either enable or disable, wherein, when said signal indicates enable, said detection means detects the channel identifiers, but when said signal indicates disable, said detection means executes no detection and outputs the ATM cell directly without any processing.

7. A transmitter equipped with a cell switching function and having an interface module to serve as an interface between ATM cells and synchronous frames, said transmitter comprising:

a plurality of first physical paths for inputting ATM cells with channel identifiers given thereto to identify channels respectively;

a plurality of second physical paths for outputting the ATM cells with the same channel identifiers as those given to said first physical paths;

a third physical path for outputting a first synchronous frame signal;

a fourth physical path for inputting a second synchronous frame signal where multi-channel ATM cells are mapped;

first detection means for detecting whether a predetermined value is set in predetermined areas of the ATM cells inputted from each of said first physical paths, and discarding any ATM cell where the predetermined value is not set;

channel identifier insertion means for inserting the channel identifiers, which are given to said first physical paths where the ATM cells are inputted, into predetermined areas of the ATM cells;

mapping means for mapping the multi-channel ATM cells, where the channel identifiers are inserted, to one first synchronous frame signal and outputting the same to said third physical path;

second detection means for detecting whether the value in the predetermined areas of the ATM cells mapped to the second synchronous frame signal inputted from said fourth physical path is coincident or not with any of the channel identifiers given to said second physical paths respectively, wherein any ATM cell not coincident with any of the channel identifiers is discarded from the second synchronous frame signal;

a plurality of channel identifier update means provided correspondingly to said second physical paths, and inserting the predetermined value into the predetermined areas of the input ATM cells and outputting the ATM cells to said second physical paths; and demapping means for demapping the ATM cells mapped to the second synchronous frame signal outputted from said second detection means, and outputting the demapped ATM cells to said channel identifier update means relevant to the channel identifier inserted into the predetermined areas of the ATM cells.

8. A transmitter having a cell switch module for routing ATM cells, comprising:

a plurality of first physical paths for inputting a first synchronous frame signal where the ATM cells are mapped;

a plurality of second physical paths for outputting a second synchronous frame signal;

demapping means for demapping the ATM cells mapped to the first synchronous frame signal inputted from each of said first physical paths;

mapping means provided correspondingly to said second physical paths for mapping the input ATM cells to the second synchronous frame signal;

an identifier conversion table containing items which include routing information relative to the first physical paths where the first synchronous frame signal is inputted, input-source channel identifiers in case the first synchronous frame signal holds multi-channel ATM cells, logical addresses of the ATM cells, routing information relative to the output destinations of the ATM cells, and channel identifiers of the output destinations of the ATM cells in case the second synchronous frame signal, where the ATM cells are mapped, holds the multi-channel ATM cells;

cross-connect means for outputting the ATM cells to the relevant mapping means on the basis of the routing information which conforms with the channel identifiers and the logical addresses of the ATM cells inputted from the first physical paths; and channel identifier update means for inserting the relevant output-destination channel identifier into the predetermined area of the first ATM cell on the basis of said routing information and the logical address relative to the input first ATM cell in case the second synchronous frame signal, where the first ATM cell is mapped, holds the multi-channel ATM cells.

9. A transmitter including a multi-channel interface module and a cell switch module, said interface module comprising:

a plurality of first physical paths for inputting ATM cells with channel identifiers given thereto to identify the channels respectively;

a plurality of second physical paths for outputting the ATM cells with the same channel identifiers as those given to said first physical paths;

a third physical path for outputting a first synchronous frame signal;

a fourth physical path for inputting a second synchronous frame signal where multi-channel ATM cells are mapped;

first detection means for detecting whether a predetermined value is set or not in a predetermined area of each ATM cell inputted from said first physical paths, and discarding any ATM cell where the predetermined value is not set;

channel identifier insertion means for inserting the channel identifiers, which are given to said first physical paths where the ATM cells are inputted, into the predetermined areas of the ATM cells;

mapping means for mapping the multi-channel ATM cells, where the channel identifiers are inserted, to one of the first synchronous frame and then outputting the same to said third physical path;

second detection means for detecting whether the value in the predetermined area of each ATM cell mapped to the second synchronous frame signal inputted from said fourth physical path is coincident or not with any of the channel identifiers given to said second physical paths respectively, and discarding, from the second synchronous frame, every ATM cell not coincident with any of the channel identifiers;

a plurality of channel identifier update means provided correspondingly to said second physical paths for inserting predetermined values in the predetermined areas of the input ATM cells, and outputting the ATM cells to said second physical paths; and demapping means for demapping the ATM cells mapped to said second synchronous frame signal outputted from said second detection means, and outputting the demapped ATM cells to the channel identifier update means relevant to the channel identifiers inserted into the predetermined areas of the ATM cells;

said cell switch module comprising:

a plurality of fifth physical paths for inputting the first synchronous frame signal;

a plurality of sixth physical paths for outputting the second synchronous frame signal;

demapping means provided correspondingly to said fifth physical paths for demapping the ATM cells mapped to the first synchronous frame signal inputted from each of said fifth physical paths;

mapping means provided correspondingly to said sixth physical paths for mapping the input ATM cells to the second synchronous frame signal;

an identifier conversion table containing items which include routing information relative to said fifth physical paths where the first synchronous frame signal is inputted, logical addresses of ATM cells, input-source channel identifiers in case the first synchronous frame signal holds multi-channel ATM cells, routing information relative to the output destinations of the ATM cells, and channel identifiers of the output destinations of the ATM cells in case the second synchronous frame signal, where the ATM cells are mapped, holds multi-channel ATM cells;

cross-connect means for outputting the ATM cells to the relevant mapping means on the basis of the routing information which conforms with the channel identifiers and the logical addresses of the ATM cells inputted from said fifth physical paths; and channel identifier update means for inserting the relevant output-destination channel identifier into the predetermined area of the first ATM cell on the basis of said routing information and the logical address relative to the input first ATM cell in case the second synchronous frame signal, where the first ATM cell is mapped, holds multi-channel ATM cells.

* * * * *